(12) United States Patent
Luo et al.

(10) Patent No.: US 11,687,504 B2
(45) Date of Patent: Jun. 27, 2023

(54) MULTIMODAL DATA REDUCTION AGENT FOR HIGH DENSITY DATA IN IIOT APPLICATIONS

(71) Applicant: Rockwell Automation Technologies, Inc., Mayfield Heights, OH (US)

(72) Inventors: Dennis Jinghui Luo, Germantown, WI (US); Francisco P. Maturana, Lyndhurst, OH (US); Robert Nunoo, Mundelein, IL (US); Jay W Schiele, Union Grove, WI (US); Braun C. Brennecke, Pittsburgh, PA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 89 days.

(21) Appl. No.: 17/157,329

(22) Filed: Jan. 25, 2021

(65) Prior Publication Data

US 2022/0237157 A1 Jul. 28, 2022

(51) Int. Cl.
| | |
|---|---|
| *G06F 16/21* | (2019.01) |
| *G06F 16/24* | (2019.01) |
| *G06F 16/215* | (2019.01) |
| *G06F 16/2455* | (2019.01) |
| *G06N 7/01* | (2023.01) |

(Continued)

(52) U.S. Cl.
CPC ...... *G06F 16/215* (2019.01); *G06F 16/24568* (2019.01); *G06N 7/01* (2023.01); *G16Y 10/75* (2020.01); *H04L 67/1097* (2013.01)

(58) Field of Classification Search
CPC .................................. G06F 16/21; G06F 16/24
See application file for complete search history.

(56) References Cited

U.S. PATENT DOCUMENTS

| | | | |
|---|---|---|---|
| 10,917,419 B2* | 2/2021 | Crotinger | G06F 11/3419 |
| 2009/0132348 A1* | 5/2009 | Bria | G06F 16/26 |
| | | | 705/7.29 |

(Continued)

FOREIGN PATENT DOCUMENTS

JP 2016002777 A * 1/2016

OTHER PUBLICATIONS

Non Final Office Action received for U.S. Appl. No. 17/234,235 dated Aug. 16, 2022, 13 pages.

*Primary Examiner* — Tyler J Torgrimson
*Assistant Examiner* — Maher N Algibhah
(74) *Attorney, Agent, or Firm* — Amin, Turocy & Watson LLP

(57) ABSTRACT

Data reduction services are implemented on one or more nodes of an IIoT data pipeline to intelligently determine an appropriate data reduction strategy based on characteristics of the incoming data. In one or more embodiments, data reduction components on the pipeline node or on an edge device define different data filtering rules or algorithms that are selectively applied to streaming time-series data based on a probability distribution of the data. The data pipeline node performs real-time distribution analysis on the streaming data to determine whether the data has a unimodal distribution, a multimodal distribution, or no mode, and selects one of the data filtering rules based on this determined probability distribution. In this way, the data is intelligently reduced in a manner that retains critical information within the reduced data set while achieving a high level of data reduction.

20 Claims, 33 Drawing Sheets

(51) Int. Cl.
  *G16Y 10/75* (2020.01)
  *H04L 67/1097* (2022.01)

(56) References Cited

U.S. PATENT DOCUMENTS

| | | | |
|---|---|---|---|
| 2011/0119212 A1* | 5/2011 | De Bruin | A61B 5/00 |
| | | | 706/12 |
| 2017/0126841 A1 | 5/2017 | Bliss et al. | |
| 2018/0157620 A1* | 6/2018 | Leonard | G06Q 30/02 |
| 2018/0232338 A1* | 8/2018 | Tasaki | G05B 23/0245 |
| 2018/0232339 A1* | 8/2018 | Tasaki | G05B 23/0227 |
| 2019/0102456 A1 | 4/2019 | Miller et al. | |
| 2019/0318288 A1* | 10/2019 | Noskov | G06Q 10/04 |
| 2019/0339688 A1* | 11/2019 | Cella | G05B 23/0229 |
| 2020/0380062 A1* | 12/2020 | Li | G01N 29/2431 |
| 2021/0297284 A1* | 9/2021 | Maeda | H04L 12/40104 |
| 2022/0067124 A1* | 3/2022 | Nishino | G06F 3/14 |

* cited by examiner

| Time Stamps | Tag Value | Mean | Median | Max | Min |
|---|---|---|---|---|---|
| 2020-09-10T13:29:26.520Z | 1 | 4.5 | 3.75 | 12 | 1 |
| 2020-09-10T13:29:26.570Z | 5 | 4.5 | 3.75 | 12 | 1 |
| 2020-09-10T13:29:26.630Z | 7 | 4.5 | 3.75 | 12 | 1 |
| 2020-09-10T13:29:26.680Z | 2.5 | 4.5 | 3.75 | 12 | 1 |
| 2020-09-10T13:29:26.730Z | 2 | 4.5 | 3.75 | 12 | 1 |
| 2020-09-10T13:29:26.780Z | 4 | 4.5 | 3.75 | 12 | 1 |
| 2020-09-10T13:29:26.830Z | 12 | 4.5 | 3.75 | 12 | 1 |
| 2020-09-10T13:29:26.880Z | 5 | 4.5 | 3.75 | 12 | 1 |
| 2020-09-10T13:29:26.930Z | 3.5 | 4.5 | 3.75 | 12 | 1 |
| 2020-09-10T13:29:26.980Z | 3 | 4.5 | 3.75 | 12 | 1 |

FIG. 5a

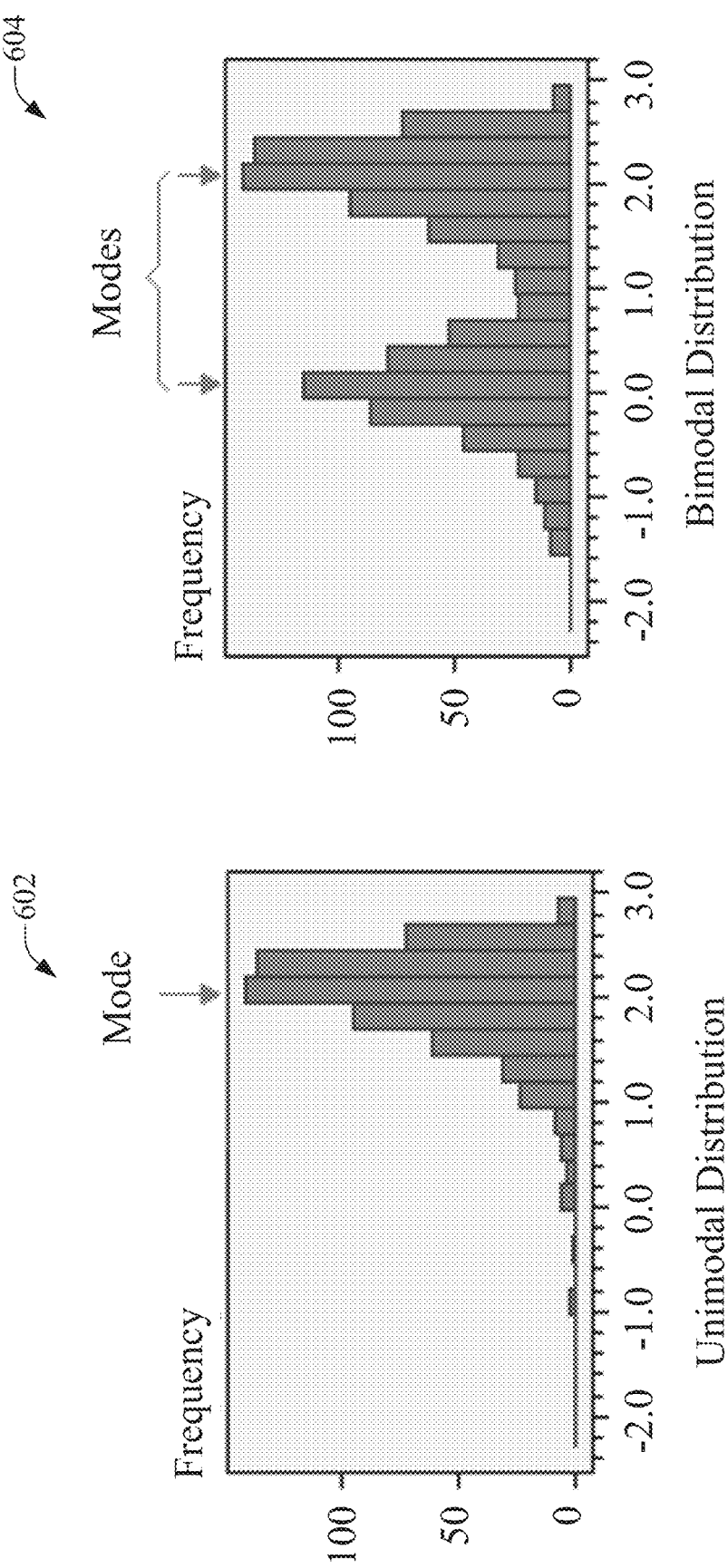

| Time Stamps | Tag Value |
|---|---|
| 2020-09-10T13:29:26.520Z | 4.5 |
| 2020-09-10T13:29:26.570Z | 4.5 |
| 2020-09-10T13:29:26.630Z | 4.5 |
| 2020-09-10T13:29:26.680Z | 4.5 |
| 2020-09-10T13:29:26.730Z | 4.5 |
| 2020-09-10T13:29:26.780Z | 4.5 |
| 2020-09-10T13:29:26.830Z | 4.5 |
| 2020-09-10T13:29:26.880Z | 4.5 |
| 2020-09-10T13:29:26.930Z | 4.5 |
| 2020-09-10T13:29:26.980Z | 4.5 |

⎯902

| Time Stamps | Tag Value |
|---|---|
| 2020-09-10T13:29:26.730Z | 4.5 |

| Time Stamps | Tag Value | Mean | Abs(TagValue – Mean) |
|---|---|---|---|
| 2020-09-10T13:29:26.520Z | 4.5 | 4.513 | 0.013 |
| 2020-09-10T13:29:26.570Z | 4.51 | 4.513 | 0.003 |
| 2020-09-10T13:29:26.630Z | 4.52 | 4.513 | 0.007 |
| 2020-09-10T13:29:26.680Z | 4.51 | 4.513 | 0.003 |
| 2020-09-10T13:29:26.730Z | 4.52 | 4.513 | 0.007 |
| 2020-09-10T13:29:26.780Z | 4.51 | 4.513 | 0.003 |
| 2020-09-10T13:29:26.830Z | 4.52 | 4.513 | 0.007 |
| 2020-09-10T13:29:26.880Z | 4.51 | 4.513 | 0.003 |
| 2020-09-10T13:29:26.930Z | 4.52 | 4.513 | 0.007 |
| 2020-09-10T13:29:26.980Z | 4.51 | 4.513 | 0.003 |

| Time Stamps | Tag Value |
|---|---|
| 2020-09-10T13:29:26.730Z | 4.513 |

FIG. 13

MULTIMODAL DATA REDUCTION AGENT FOR HIGH DENSITY DATA IN IIOT APPLICATIONS

BACKGROUND

The subject matter disclosed herein relates generally to industrial automation, and, more particularly, collection of industrial data.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a node system is provided, comprising a data input component configured to receive a data batch comprising one or more time-series values of a data tag of an industrial device; a modal analysis component configured to select a data reduction algorithm, from multiple predefined data reduction algorithms, based on a number of modes that occur in a probability distribution of the time-series values; and a data reduction component configured to apply the data reduction algorithm to the data batch to yield a reduced data set.

Also, one or more embodiments provide a method, comprising receiving, by a system comprising a processor, a data batch comprising one or more time-series values of a data tag of an industrial device; selecting, by the system based on a number of nodes detected in a probability distribution of the time-series data, a data reduction algorithm from multiple predefined data reduction algorithms; and applying, by the system, the data reduction algorithm to the data batch to yield a reduced data set.

Also, according to one or more embodiments, a non-transitory computer-readable medium is provided having stored thereon instructions that, in response to execution, cause a system comprising a processor to perform operations, the operations comprising receiving a data batch comprising one or more time-series values of a data tag of an industrial device; selecting, based on a number of nodes detected in a probability distribution of the time-series data, a data reduction algorithm from multiple predefined data reduction algorithms; and applying the data reduction algorithm to the data batch to yield a reduced data set.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 5a is an example set of time-series data collected from a data tag of an industrial device, which can be included as part of a data batch being processed by a node system of an IIoT data pipeline.

FIG. 5b is a graph of the time-series data depicted in FIG. 5a.

FIG. 6a is a graph representing a unimodal probability distribution.

FIG. 6b is a graph representing a bimodal probability distribution.

FIG. 10 is a table of raw values of a data tag and a table of the reduced data set after a No Change reduction strategy is applied.

FIG. 13 is a table of example raw values of a data tag and a table of the reduced data set after a Small Change reduction strategy is applied.

DETAILED DESCRIPTION

Figure 1:
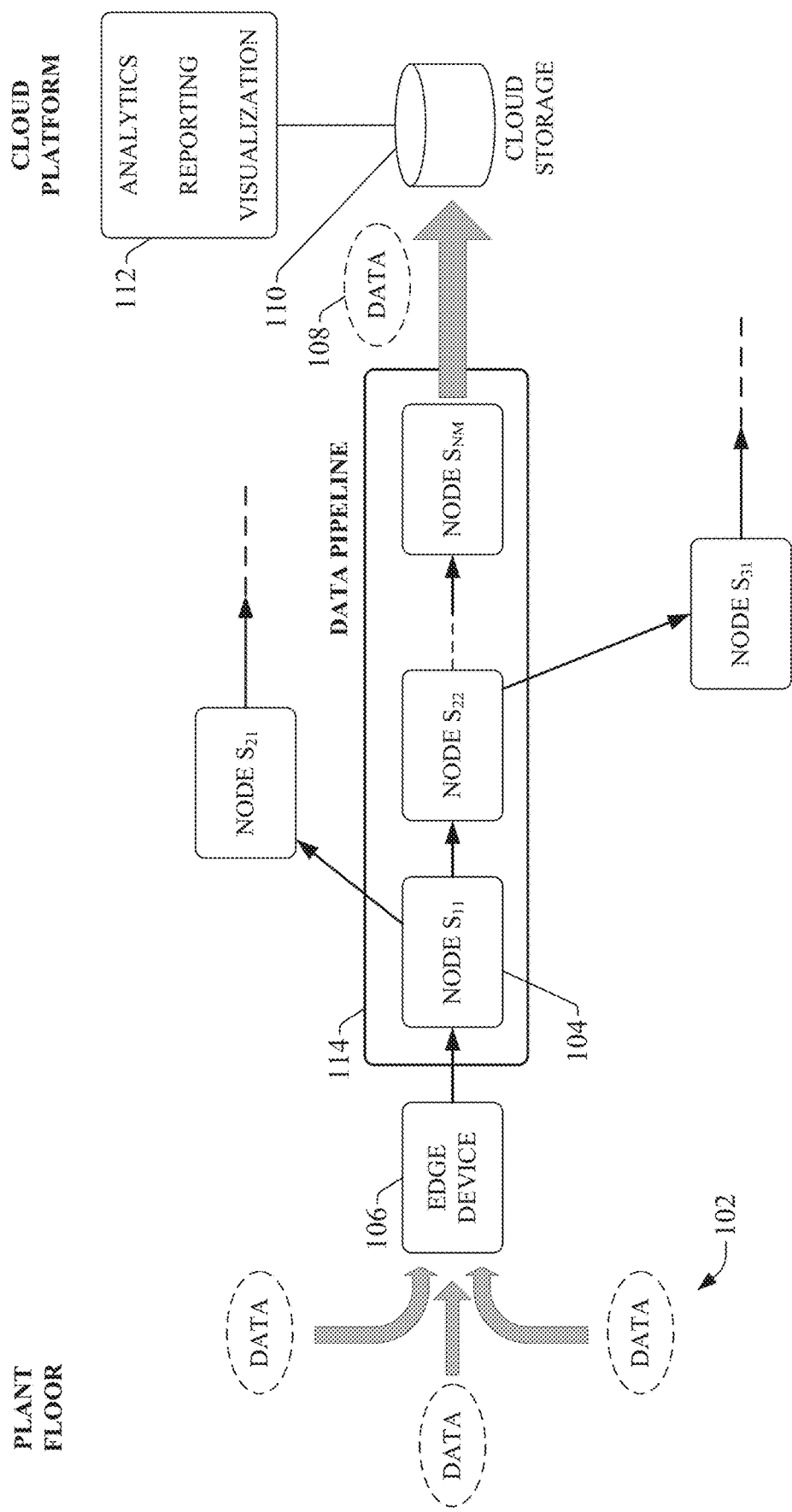
FIG. 1 is a diagram illustrating an example IIoT data pipeline.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback, electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. The amount of generated automation data further increases as additional plant facilities are added to an industrial enterprise.

To gain insights into the operation of plant-floor automation systems and processes, this high-density industrial data can be collected and streamed to analytics, visualization, or reporting systems residing on a cloud platform or another high-level platform via a data pipeline, or a network of parallel data pipelines, as part of an industrial internet of things (IIoT) architecture. FIG. 1 is a diagram illustrating an example IIoT data pipeline. Data pipeline 114 can comprise a series of chained nodes 104 capable of relaying aggregated industrial data 102 from an edge device 106 residing on the plant floor to cloud storage 110. Nodes 104 may be server devices, microservices executing on respective computer hardware platforms, or other such processing elements. Each of the chained nodes 104 receives data from an adjacent upstream node 104 and passes this data to an adjacent downstream node 104 to thereby convey data from the source to the destination. In some architectures, a sending node can be connected to multiple upstream feeder nodes and/or multiple downstream receiving nodes. In addition to conveying collected industrial data through the pipeline 114, a given node 104 may also perform processing on received data in accordance with a data processing application installed on the node 104. Such application may include, but are not limited to, notification applications that generate and send notifications to specified client devices if any of the data satisfies a defined notification criterion, data transformation applications that transform or reformat the data to suit the needs of a target application, or other such applications.

Any of the nodes 104 or edge device 106 may perform processing on the collected data 102 as the data is streaming through the pipeline 114, and as such the data 108 that is delivered to the cloud storage 110 may be a processed version of the data 102 collected from the plant floor devices and sensors that make up the plant floor automation systems. Once the data 108 has been moved to cloud storage 110, the data 108 can be analyzed or visualized by high-level applications 112.

Many IIoT applications convey variable data volumes that must be organized for reporting or analysis purposes. When time-series data on the plant floor is generated at a high-speed rate, the large volume of data that is streamed through the pipeline 114 can cause problems in the cloud-based applications due to the large data point density. For example, processing large volumes of data can increase the processing latency of the cloud-side applications, which may result in data congestion within the pipeline 114, or may overload those applications and necessitate a system restart. In the case of visualization applications, such as cloud-based HMIs, the total volume of raw data generated by the plant-floor industrial devices may be too large and noisy to render a clear visualization that can be easily interpreted by a viewer, and as such visualizing the raw data in its entirety can obscure important events or trends within the data.

To reduce the volume of data provided to the cloud-side applications, additional data pipeline backplane processing can be implemented to perform data reduction steps on the streaming data, resulting in a smaller data set that is more suitable for cloud-side visualization or reporting. However, arbitrary truncation of data using a simple truncation criterion cannot guaranteed data consistency and accuracy. With such approaches, there is a trade-off between high data reduction and data accuracy. As such, crude truncation approaches may reduce data volume but may also reduce the accuracy of reporting, analytic, or predictive applications that consume the data. Moreover, simple data truncation strategies do not maintain an associative link between the reduced data set and the original raw data, leaving no means for a user to easily access a selected set of the original raw data corresponding to a particular subset of the reduced data set in order to view higher-resolution data surrounding a selected point in time.

To address these and other issues, one or more embodiments described herein provide data reduction services that can be implemented in one or more nodes of an IIoT data pipeline to intelligently determine an appropriate data reduction strategy based on characteristics of the incoming data. In one or more embodiments, data reduction components on the pipeline node or on an edge device can define different data filtering rules or algorithms that can be selectively applied to a given set of streaming time-series data based on a probability distribution of the data. The data pipeline node can perform real-time distribution analysis on the streaming data to determine whether the data has a unimodal distribution, a multimodal distribution, or no mode, and select one of the data filtering rules based on this determined probability distribution. Additional filtering rules can also be defined for cases in which there is no change in the data or only small changes to the data within a given data set (e.g., a given batch of data being conveyed through the data pipeline 114). In this way, the data is intelligently reduced in a manner that retains critical information within the reduced data set while achieving a high level of data reduction. This approach can yield a reduced data set by identifying nominal data that is not associated with anomalies, thereby maintaining high accuracy.

Additionally, the data reduction services define linkages that associate items of the reduced data set with their corresponding sets of raw data, thereby creating a means to easily access the original higher-resolution data surrounding a selected item of the reduced data set. Thus, synchronization between the reduced data set and the corresponding raw data is maintained, allowing a user to easily navigate between lower-resolution visualization of the data to the higher-resolution raw data.

Figure 2:
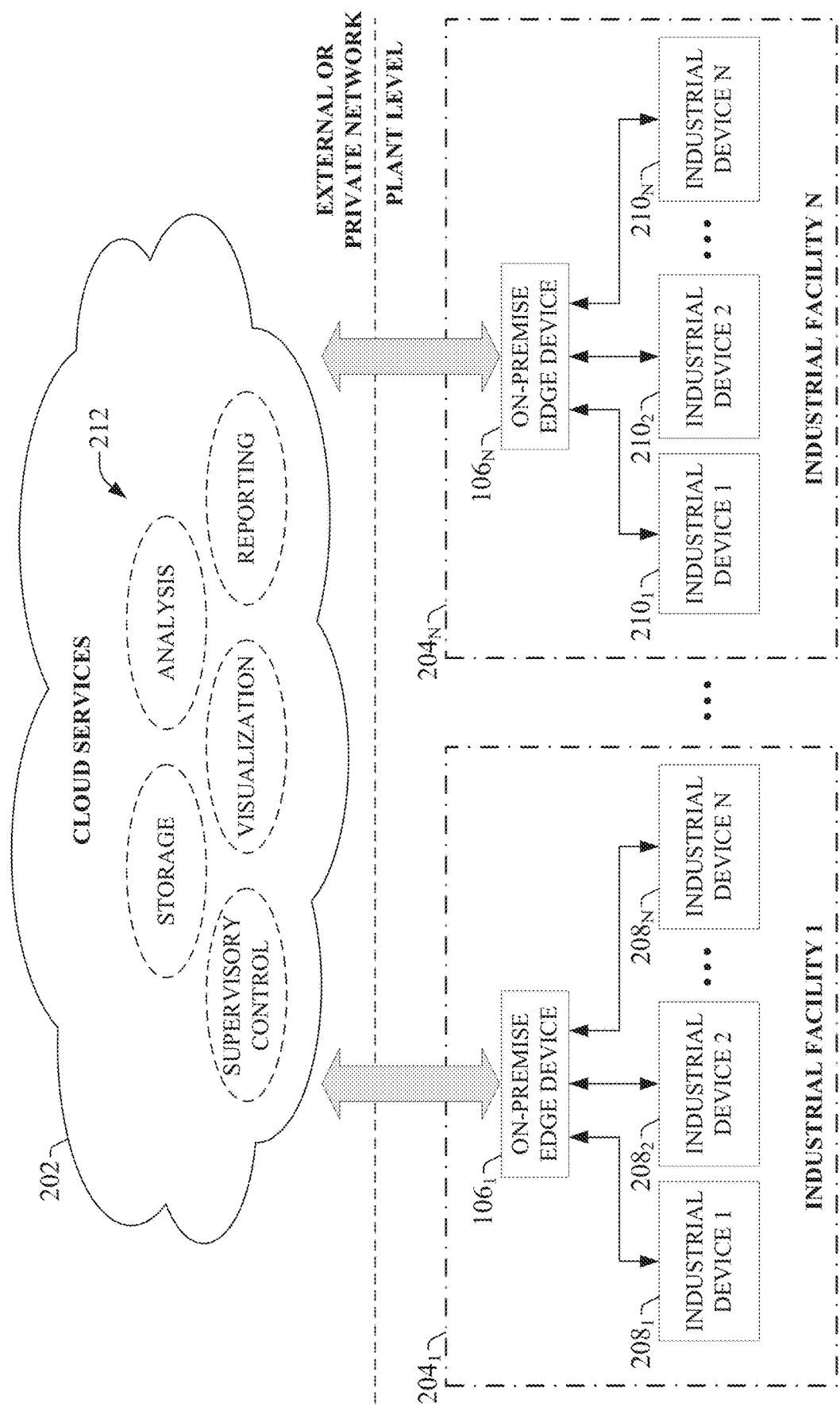
FIG. 2 illustrates a high-level overview of an architecture in which data from an industrial enterprise can be migrated to a cloud platform.

As noted above, the IIoT data reduction system described herein can be used as part of an IIoT data pipeline used to migrate data generated at one or more plant facilities to a cloud environment for storage, analysis, reporting, or visualization. FIG. 2 illustrates a high-level overview of an architecture in which data from an industrial enterprise can be migrated to a cloud platform. This architecture is an example context in which embodiments of the reactive buffering system can be used. The enterprise comprises one or more industrial facilities 204, each having a number of industrial devices 208 and 210 in use. The industrial devices 208 and 210 can make up one or more automation systems operating within the respective facilities 204. Example automation systems can include, but are not limited to, batch control systems (e.g., mixing systems), continuous control systems (e.g., PID control systems), or discrete control systems. Industrial devices 208 and 210 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); safety relays, optical safety systems, or other such industrial devices.

Industrial automation systems can include one or more industrial controllers that facilitate monitoring and control of their respective processes. These industrial controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the example architecture illustrated in FIG. 2 depicts the industrial devices 208 and 210 as residing in fixed-location industrial facilities 204, the industrial devices 208 and 210 may also be part of a mobile control application, such as a system contained in a truck or other service vehicle.

On-premise edge devices 106 can collect data from industrial devices 208 and 210—or from other data sources, including but not limited to data historians, business-level systems, etc.—and feed this data into a data pipeline (e.g., pipeline 114 in FIG. 1) which migrates the data to the cloud platform 202 for processing and storage. Cloud platform 202 can be any infrastructure that allows cloud services 212 to be accessed and utilized by cloud-capable devices. Cloud platform 202 can be a public cloud accessible via the Internet by devices having Internet connectivity and appropriate authorizations to utilize the services 212. In some scenarios, cloud platform 202 can be provided by a cloud provider as a platform-as-a-service (PaaS), and the services 212 (e.g., data analysis, visualization, reporting, etc.) can reside and execute on the cloud platform 202 as a cloud-based service. In some such configurations, access to the cloud platform 202 and the services 212 can be provided to customers as a subscription service by an owner of the services 212. Alternatively, cloud platform 202 can be a private or semi-private cloud operated internally by the enterprise, or a shared or corporate cloud environment. An exemplary private cloud can comprise a set of servers hosting the cloud services 212 and residing on a corporate network protected by a firewall.

Cloud services 212 can include, but are not limited to, data storage, data analysis, control applications (e.g., applications that can generate and deliver control instructions to industrial devices 208 and 210 based on analysis of real-time system data or other factors), automation system or process visualization applications (e.g., a cloud-based HMI), reporting applications, Enterprise Resource Planning (ERP) applications, notification services, or other such applications. Cloud platform 202 may also include one or more object models to facilitate data ingestion and processing in the cloud.

Ingestion of industrial device data in the cloud platform 202 can offer a number of advantages particular to industrial automation. For one, cloud-based storage offered by the cloud platform 202 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. In another example application, cloud-based diagnostic applications can monitor the health of respective automation systems or their associated industrial devices across an entire plant, or across multiple industrial facilities that make up an enterprise. Cloud-based IIoT control applications can be used to track a unit of product through its stages of production and collect production data for each unit as it passes through each stage (e.g., barcode identifier, production statistics for each stage of production, quality test data, abnormal flags, etc.). Moreover, cloud-based control applications can perform remote decision-making for a controlled industrial system based on data collected in the cloud from the industrial system, and issue control commands to the system. These industrial cloud-computing applications are only intended to be exemplary, and the systems and methods described herein are not limited to these particular applications. The cloud platform 202 can allow software vendors to provide software as a service, removing the burden of software maintenance, upgrading, and backup from their customers.

Figure 3:
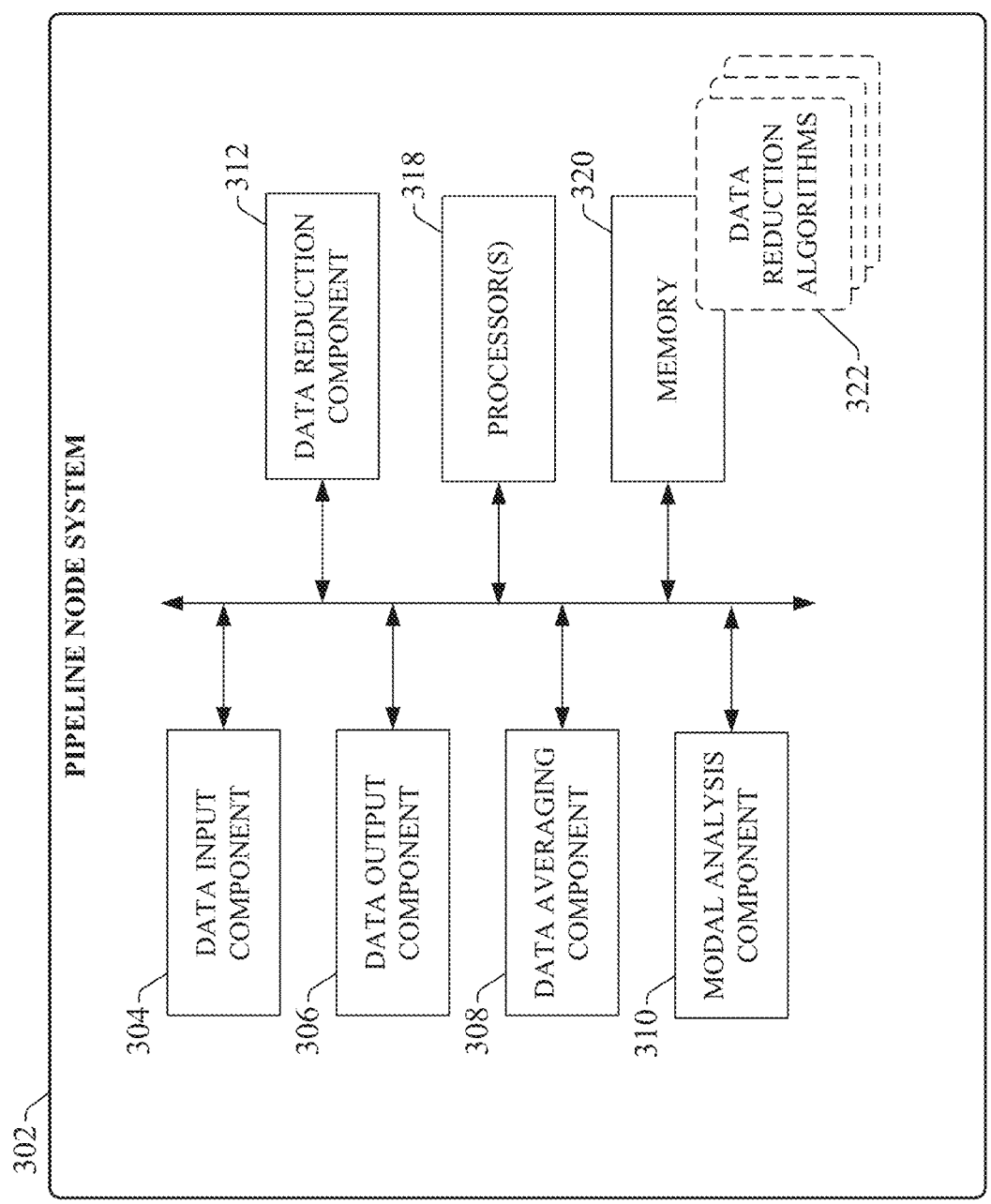
FIG. 3 is a block diagram of an example pipeline node system.

FIG. 3 is a block diagram of an example pipeline node system 302 (also referred to herein simply as a node) according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Node system 302, which can be a node of an IIoT data pipeline having at least some of the functions of nodes 104 described above, can include a data input component 304, a data output component 306, a data averaging component 308, a modal analysis component 310, a data reduction component 312, one or more processors 318, and memory 320. In various embodiments, one or more of the data input component 304, data output component 306, data averaging component 308, modal analysis component 310, data reduction component 312, the one or more processors 318, and memory 320 can be electrically and/or communicatively coupled to one another to perform one or more of the functions of the node system 302. In some embodiments, components 304, 306, 308, 310, and 312 can comprise software instructions stored on memory 320 and executed by processor(s) 318. Node system 302 may also interact with other hardware and/or software components not depicted in FIG. 3. For example, processor(s) 318 may interact with one or more external user interface devices, such as a keyboard, a mouse, a display monitor, a touchscreen, or other such interface devices.

Data input component 304 can be configured to receive batches of data from an adjacent upstream node system of the data pipeline or from an edge device 106 (if the node system 302 is the first node of a data pipeline). Data output component 306 can be configured to send data—including both raw data received from the upstream node and a reduced version of the data—to an adjacent downstream node system of the data pipeline in data batches.

The data averaging component 308 can be configured to calculate, for each data tag of a current data batch, a weighted moving average of the time-series data values generated by the data tag. The modal analysis component 310 can be configured to analyze the values of the current batch of time-series data, as well as the weighted moving average calculated by the data averaging component 308, to determine a relative amount of change and a probability distribution (e.g., unimodal, multimodal, no mode, etc.) of the data values for each data tag in the data batch. The data reduction component 312 can be configured to select a data reduction algorithm 322 from multiple defined reduction algorithms 322 based on the distribution determined by the modal analysis component 310, and to apply the selected data reduction algorithm to the data batch to yield a reduced data set.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Although FIG. 3 and examples described herein depict the data reduction functionality (e.g., components 304, 306, 308, 310, and 312) as being embodied on a node of the data pipeline, in some embodiments the data reduction functionality can be embodied on an edge device (e.g., edge device 106) so that data reduction processing can be applied to the collected data 102 by the edge device prior to injecting the reduced data into the pipeline 114.

Figure 4:
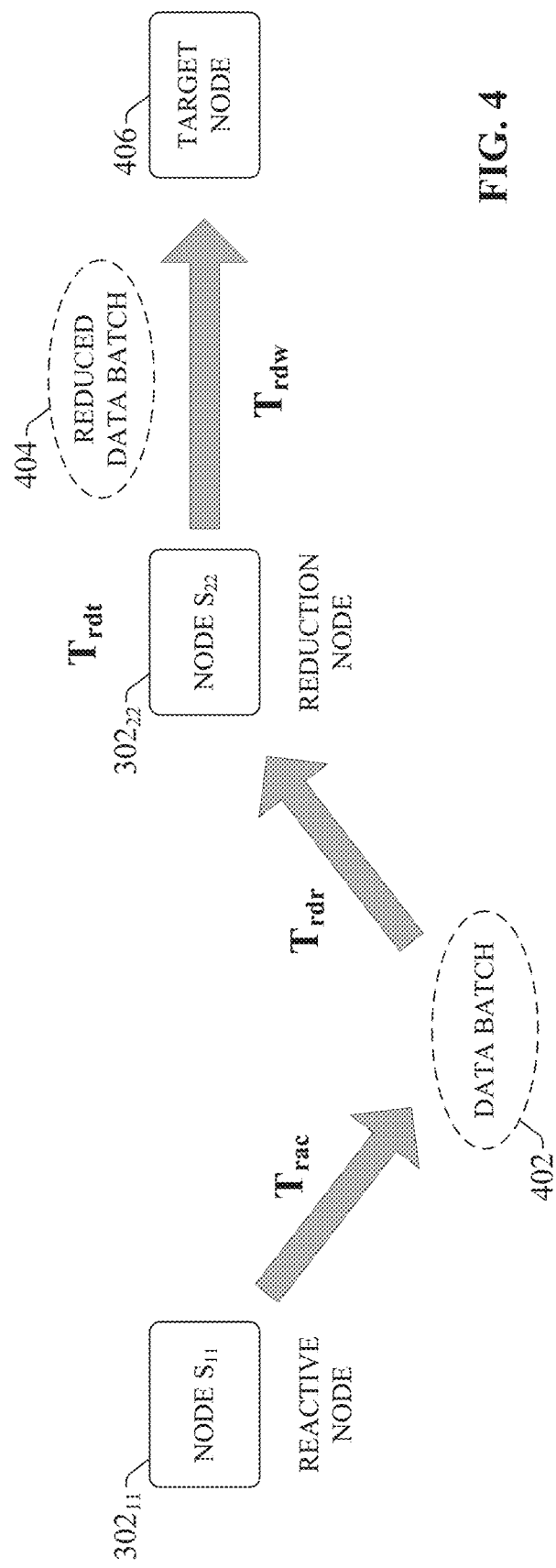
FIG. 4 is a diagram illustrating movement of data across nodes of an IIoT data pipeline.

FIG. 4 is a diagram illustrating movement of data across nodes of an IIoT data pipeline. In this example, pipeline node systems $302_{11}$ and $302_{22}$ are two adjacent nodes of an example IIoT data pipeline. When data is being sent from a node (i.e., node system 302) of a data pipeline to an adjacent downstream node, the node that is sending the data—e.g., node system $S_{11}$ in FIG. 4—is referred to as the reactive node, while the node that receives and acts on the data—e.g., node system $S_{22}$—is referred to as the reduction node. Since nodes that are not at the extreme ends of the pipeline will both receive data from adjacent upstream nodes and send data to adjacent downstream nodes, these nodes act as both reactive and reduction nodes at various stages of their operation within a given data transmission cycle. FIG. 4 also depicts a target node 406, which is adjacent to and downstream from the reduction node $S_{22}$. Target node 406 may be either another node system 302 of the pipeline, or a final storage destination for the data (e.g., a cloud-based storage node). As noted above, node systems 302 may be servers, micro-services, or other processing elements that form the backbone of the IIoT data pipeline.

In-motion data moves from node to node in micro-batches, or data batches. In some embodiments the size of these micro-batches is fixed. In other embodiments, the reactive node system $302_{11}$ ($S_{11}$) can be capable of dynamically adjusting the size of its outgoing data batches 402 based on the processing latency experienced at the adjacent reduction node system $302_{22}$ ($S_{22}$). The processing latency at the reduction node system $302_{22}$ can be characterized by a set of time variables that quantify the times required to perform various tasks associated with processing and moving the data.

For example, $T_{rac}$ represents the time required for the reactive node system $302_{11}$ to collect the data that is to be included in the data batch 402 from an adjacent upstream data source (e.g., an upstream reactive node, one or more IIoT industrial devices, or an edge device 106). In general, this time to collect the data can be given as the product of the size $N_S$ of the incoming data batch and the time $T_u$ required for the reactive node system $302_{11}$ to collect a record for a single data tag of the batch:

$$T_{rac} = N_s * T_u \qquad (1)$$

The time required for the reduction node system $302_{22}$ to read the data batch 402 from the reactive node system $302_{11}$ is given by $T_{rdr}$. Upon reading the data batch 402, the reduction node system $302_{22}$ may apply processing to transform the data contained in the data batch 402. In some applications this transformation may include applying data reduction processing to the data in order to reduce the data set. As will be discussed in more detail below, this can include detecting and removing anomalous data or outlier data, as well as applying a selected data reduction algorithm that filters the data based on an amount of change and a probability distribution of the data within the batch. In some scenarios, the reduction node system $302_{22}$ may also process the incoming data batch 402 according to a node-specific application that executes on the node system (e.g., a notification application, an analytic application, etc.). The time required for the reduction node system $302_{22}$ to reduce, process, or otherwise transform the data is given by $T_{rdt}$. The time required for the reduction node system $302_{22}$ to then write the resulting reduced data batch 404 to the target node 406 is represented by $T_{rdw}$. The total time $T_{rd}$ required for the reduction node system $302_{22}$ to receive, process, and send the incoming data batch 402 can thus be given as $$T_{rd} = T_{rdr} + T_{rdt} + T_{rdw} \qquad (2)$$

Figure 5B:
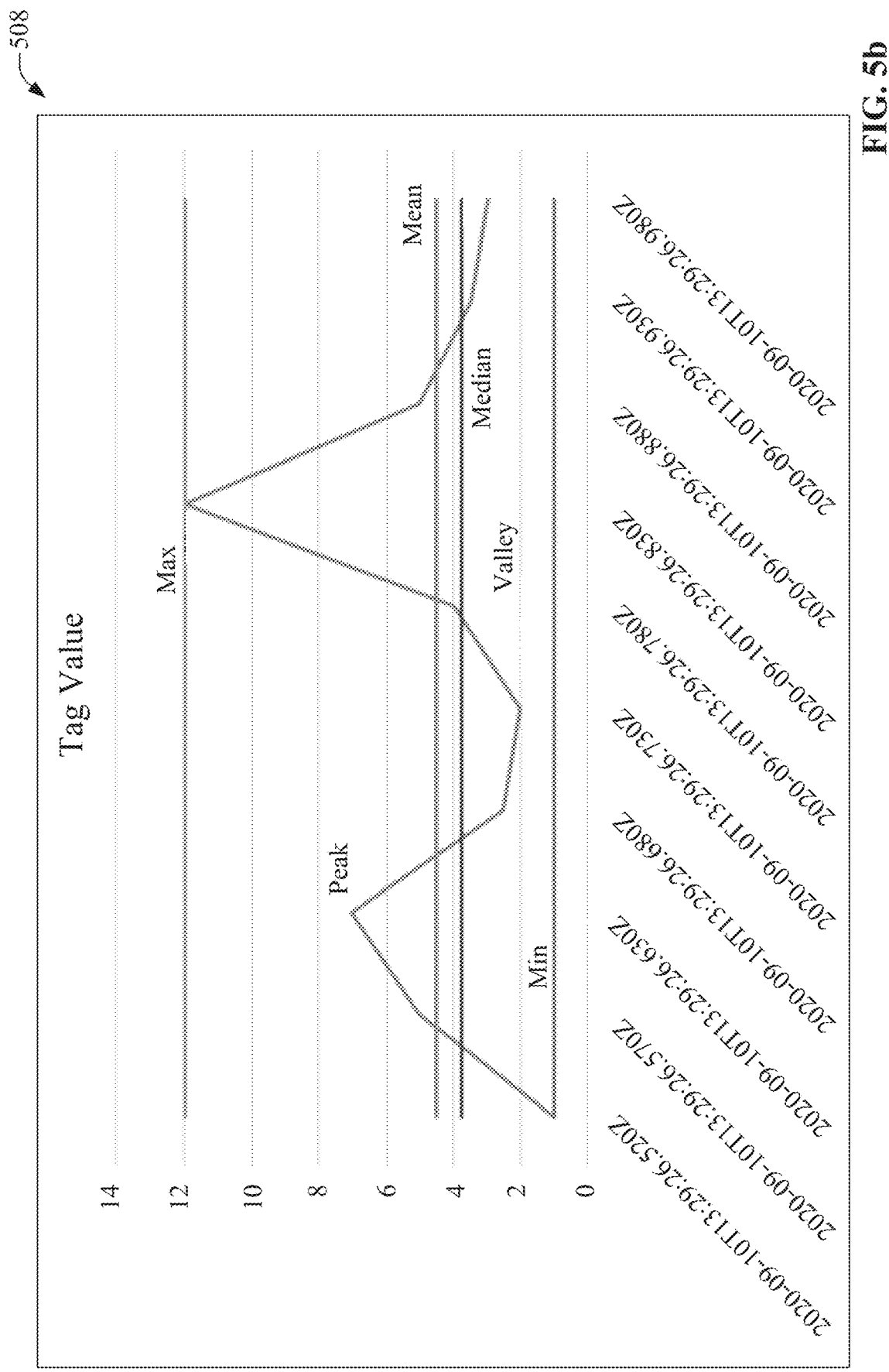

FIG. 5a is a table 502 of an example set of time-series data collected from a data tag of an industrial device, which can be included as part of a data batch being processed by a node system 302 of an IIoT data pipeline. FIG. 5b is a corresponding graph 508 of the time-series data tabulated in FIG. 5a. Data 502 may be part of a data batch being processed by a node system 502, and comprises data generated by a data tag of an industrial device (e.g., an industrial controller, a motor drive, a telemetry device, a sensor, etc.) on the plant floor. Although data from only a single data tag is depicted in FIGS. 5a and 5b, a given data batch being processed by a node of an IIoT data pipeline may comprise different sets of time-series data collected from respective different data tags. Each data value 506 has an associated time stamp 504 indicating a time that the data value was generated by the corresponding plant floor device. For illustrative purposes, in addition to the time stamps and tag values that are typically included the time-series data, table 502 also includes columns for the mean value, median value, maximum value, and minimum value of the tag values.

Analysis of the time-series data contained in a batch can yield insights into the degrees of change and the key data values contained in the batch. With reference to FIG. 5b, such analysis can include identification of local peaks and valleys within the data, maximum and minimum values, the mean value, and the median value. Based on these characteristics of the data 502, the node system 302 can identify whether the time-series data 502 changes significantly over time, and if so, determine a mode of the data 502 based on a probability distribution.

FIGS. 6a and 6b are graphs 602 and 604 representing probability distributions for two example sets of data. The probability distribution represents a frequency of each value contained in the data set, or a number of times each value occurs in the data set. Based on this distribution, a data set can be characterized as having a mode if at least one data value has a local peak, which indicates that this data value has a predominance within the data set. Data sets that have such peaks—also referred to as modes—in their probability distributions can be further characterized as being unimodal if only a single peak is present, or multimodal if two or more peaks are present. Graph 602 depicts an example unimodal distribution having a single mode, while graph 604 depicts an example multimodal distribution having two peaks (a bimodal distribution). As will be described in more detail herein, the node system 302 analyzes each data set's probability distribution and, based on results of this analysis, selects a suitable data reduction rule or algorithm to apply to the data set to yield the reduced data set.

Figure 7:
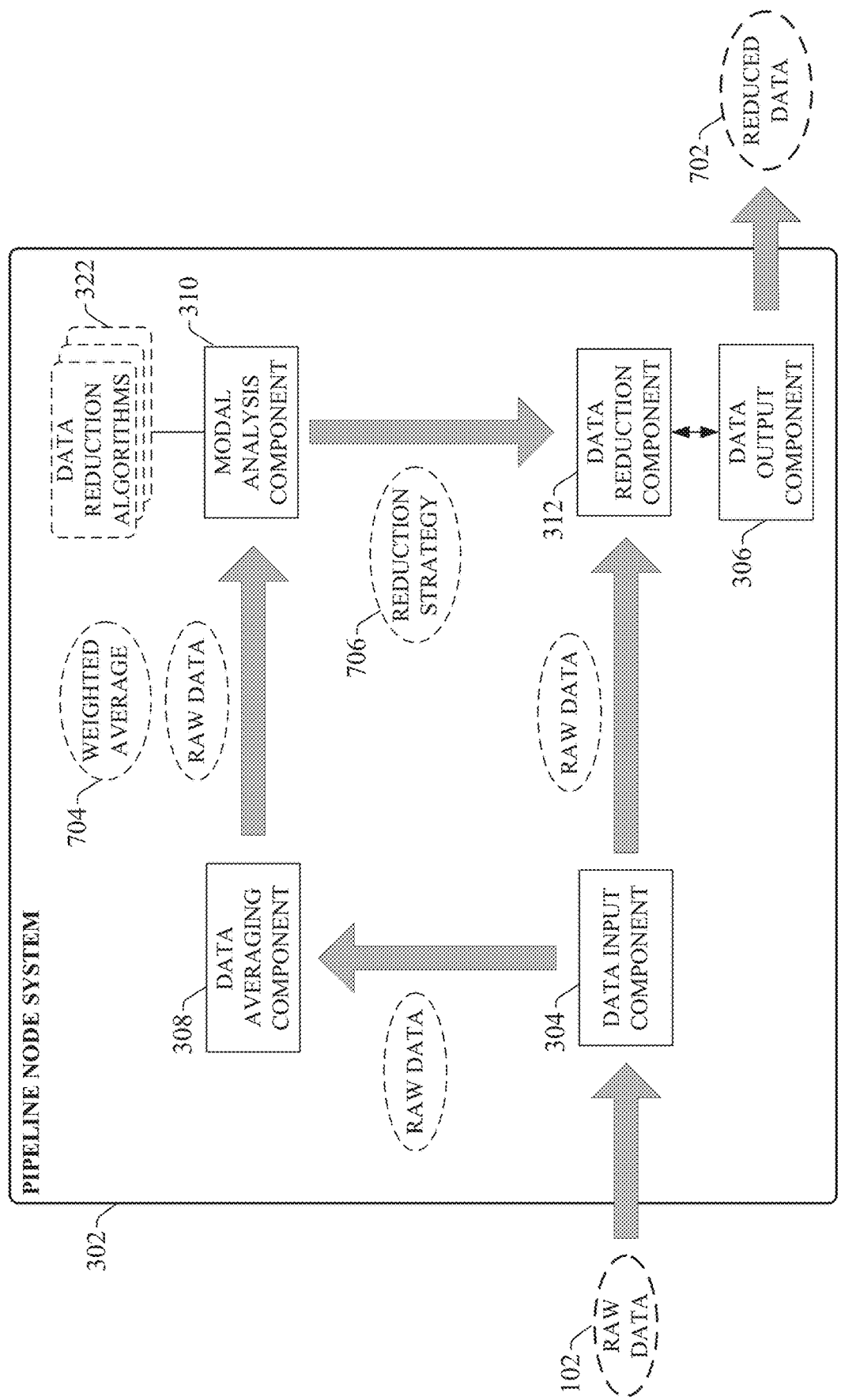
FIG. 7 is a diagram illustrating an example data reduction process that can be carried out by a node system.

FIG. 7 is a diagram illustrating an example data reduction process that can be carried out by node system 302 according to one or more embodiments. Raw data 102 is received by the node system 302 via the data input component 304. The raw data 102 can comprise a data batch sent by an adjacent upstream node or edge device of the data pipeline or, if the data reduction functionality is implemented on an edge device, may be raw data collected directly from data tags of one or more industrial devices on the plant floor. The raw data 102 may comprise, for each data tag, both time-series data values corresponding to a time range represented by the data batch as well as time stamps indicating a time that each of the time-series values was generated. Raw data 102 may also include tag information identifying the data tag from which the data was collected and other such metadata.

The raw data is provided to the data averaging component 308, which determines, for each data tag represented in the batch of raw data 102, a weighted moving average 704 for the data. The weighted moving average is used to determine whether the data values for the data tag vary by only a small amount, and therefore invoke a Small Change data reduction rule. The weighted moving average 704 and the raw data are then provided to the modal analysis component 310 which selects a data reduction algorithm 322 from a library of predefined reduction algorithms based on analysis of the weighted average 704 and the raw data. In general, the modal analysis component 310 selects a data reduction algorithm 322 to be applied to each tag's data based on a determination of whether the time-series values associated with the tag do not change across the time range represented by the raw data 102, a determination of whether the values change by only a small degree, or a determination of the number of modes in the data's distribution.

Once a data reduction algorithm 322 has been selected, the modal analysis component 310 instructs the data reduction component 312 to apply the data reduction strategy 706 defined by the selected data reduction algorithm 322 to the raw data for the data tag. This results in a reduced data set 702 in which items of the raw data 102 considered non-essential are removed. As part of the data reduction process, the data reduction component 312 also maintains an associative link between each item of the reduced data set 702 and the corresponding values of raw data 102 that surround the data item. The data output component 306 then sends the reduced data set 702 to the next node of the pipeline, or to the data's final destination (e.g., a cloud-based visualization, reporting, or analytic application). Data output component 306 can also send the raw data 102 with the reduced data set 702, together with the defined associations or linkages between the reduced data set 702 and the raw data 102.

Figure 8:
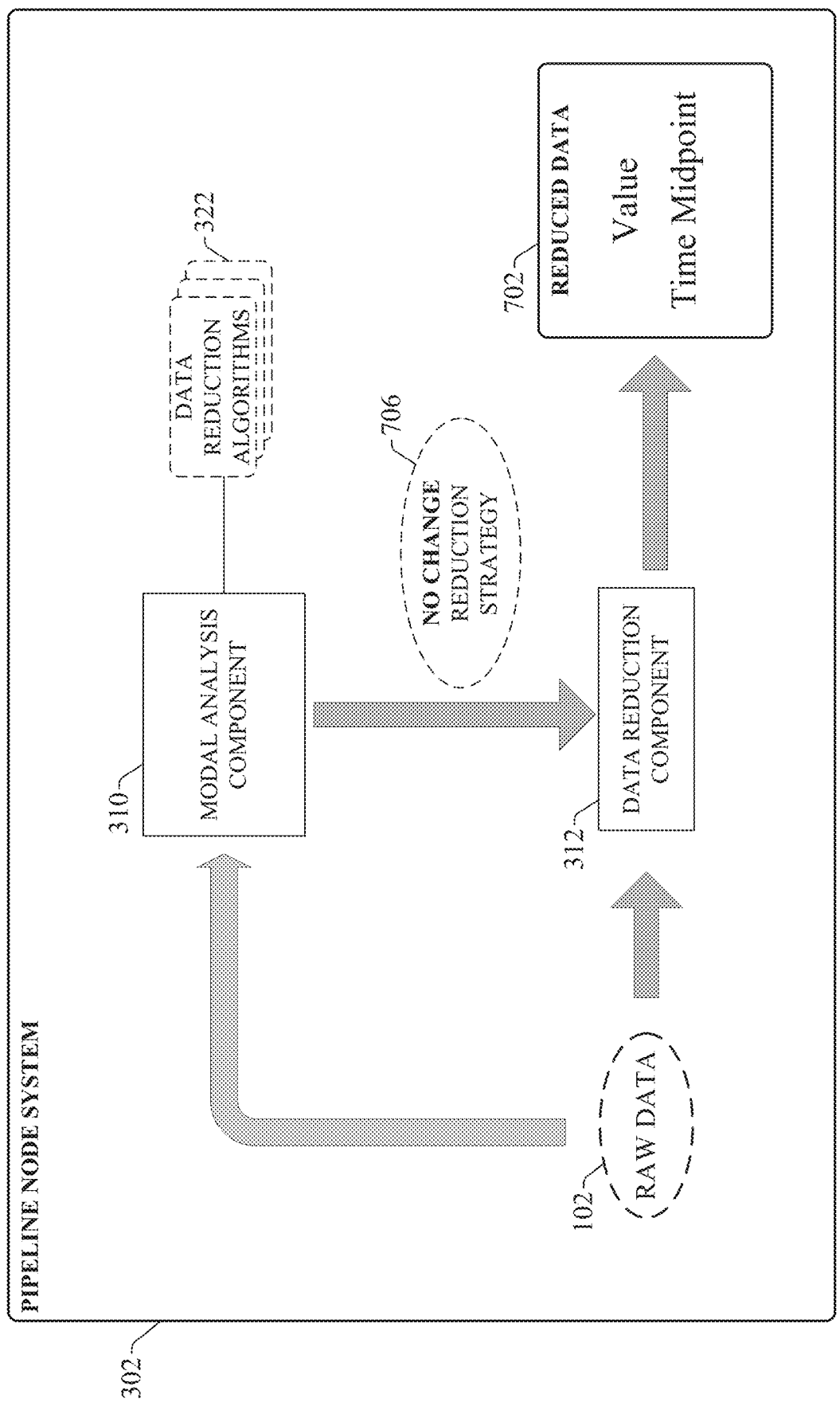
FIG. 8 is a diagram illustrating application of a No Change reduction strategy.

Example data reduction algorithms 322 that can be applied by embodiments of node system 302 for different data distribution scenarios are now described. FIG. 8 is a diagram illustrating application of a No Change reduction strategy 706. When raw data 102 is received by the node system 302, the data input component 304 (not shown in FIG. 8) may pre-process the data 102 in preparation for data reduction analysis. This may include, for example, removing outlier data that is likely to be invalid, sorting or ordering the data according to time stamps, removing non-numerical values, or performing other such pre-processing.

Figure 9:
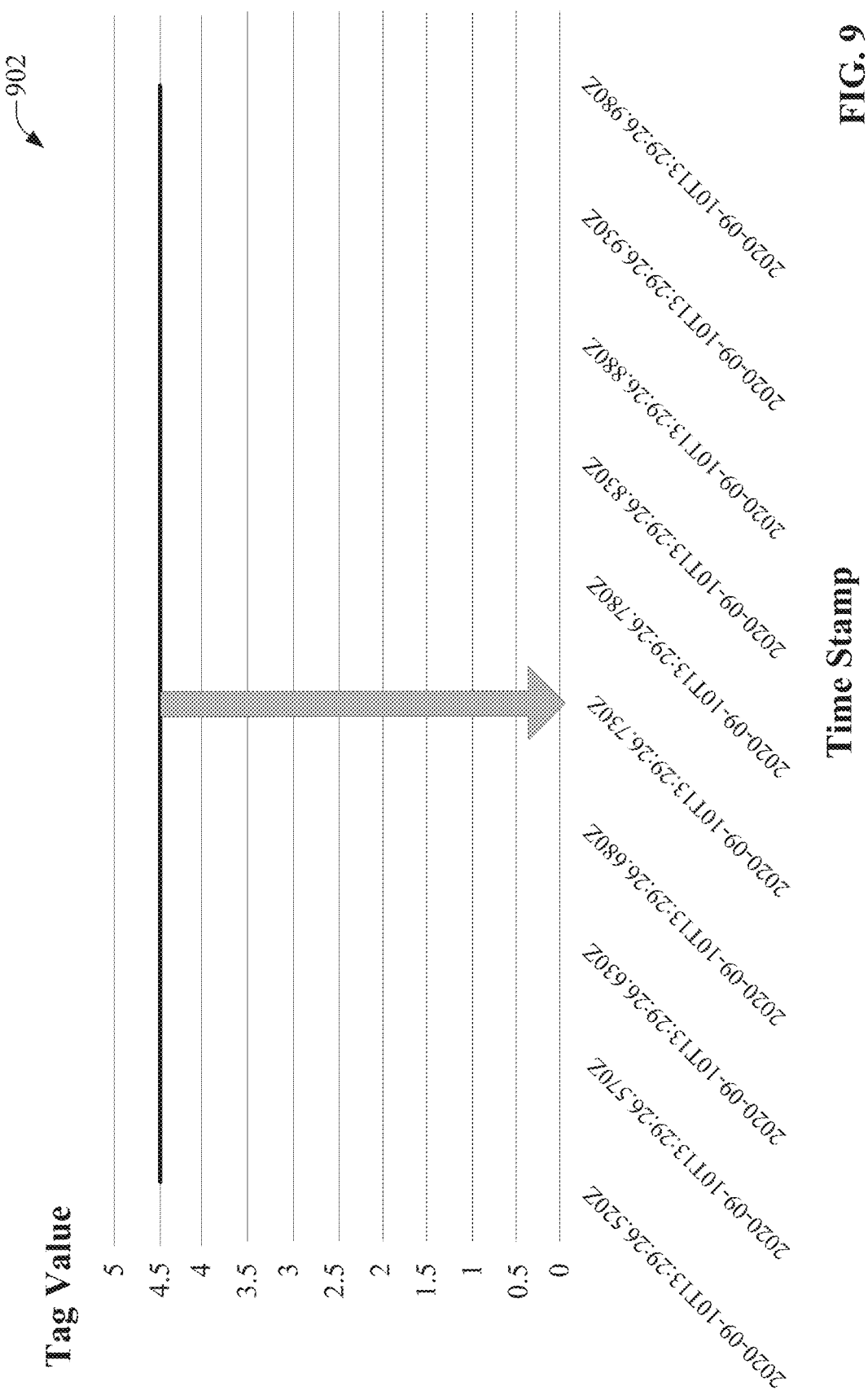
FIG. 9 is a graph of example time-series values of a data tag that invokes a No Change data reduction strategy.

For a given data tag represented in the batch of raw data 102, the modal analysis component 310 selects the No Change reduction strategy 706 from among the data reduction algorithms 322 in response to determining that the values for the data tag are equal for all the time stamps included in the data batch. FIG. 9 is a graph 902 of example time-series values of a data tag represented in the raw data 102 that invokes a No Change data reduction strategy. As shown in this example, the data tag value remains consistent (V=4.5) across all time stamps. The modal analysis component 310 can use any suitable technique to determine whether the data values are equal for all time stamps; e.g., by determining whether the maximum data value is equal to the minimum value.

Since the data values remain unchanged for all time stamps included in the batch of raw data, it is considered necessary to send only a single data value from the raw data set as the reduced data set 702. According to the No Change reduction strategy, the reduced data set 702 comprises a single data item or record including the value of the data tag and a time stamp selected from the midpoint, or an approximate midpoint, of the time range included in the data batch, as well as a data tag identifier. FIG. 10 is a table 902 of the raw values of the data tag and a table 904 of the reduced data set 702 after the No Change reduction strategy is applied. In this example, the reduced data set represented by table 904 comprises only the data value and corresponding time stamp selected from the midpoint or approximate midpoint of the time range of the raw data (the data record highlighted in table 902). In this example, the No Change data reduction strategy reduces a batch of raw data 102 comprising 10 data points to a single data point.

Figure 11:
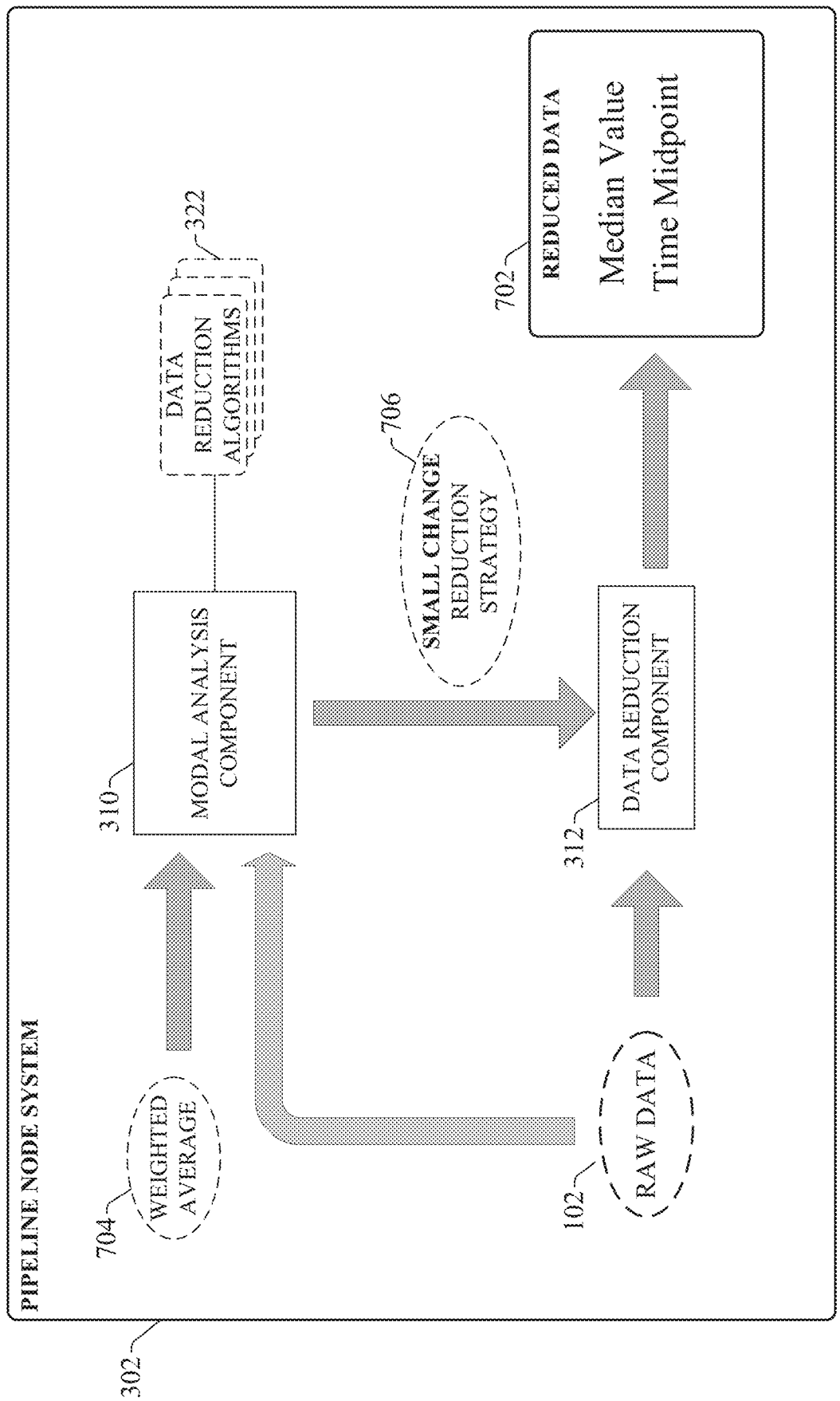
FIG. 11 is a diagram illustrating application of a Small Change reduction strategy.

FIG. 11 is a diagram illustrating application of a Small Change reduction strategy 706. If the modal analysis component 310 determines that a data tag included in the raw data 102 does not invoke the No Change data reduction strategy, the weighted moving average 704 for the raw data 102 is examined. As noted above, for each data tag represented in the current batch of raw data 101, the data averaging component 308 generates a weighted moving average 704 of the data values for that data tag. In some embodiments, the weighted average can be calculated based on an assumption that more recent data—representing more recent events detected on the plant floor—are of greater interest than older data and events. With this in mind, the weighted moving average can weigh more recent values of the data tag more heavily than older values. An example weighted average calculation that can be applied by the data averaging component 308 can be given by:

$$\text{Average} = W_1 * V_{n-1} + W_2 * V_{n-2} + \ldots + W_{k-1} * V_{n-k+1} + W_k * V_{n-k} \quad (3)$$

where k is the number of data items or records in the data batch, $W_i$ is a weighted coefficient between 0 and 1 for i=1 through k, $V_j$ is the value of the data tag at a point in time $T_j$ for j=1 through k, and n is an integer. Other approaches for calculating an average for the time-series data tag values are also within the scope of one or more embodiments.

In equation (3) the values of the weighted coefficients $W_i$ are assumed to decrease as i increases, such that more recent values (e.g., $V_{n-1}$) are weighed more heavily than less recent values (e.g., $V_{n-k}$). In an example scenario in which the data batch comprises five records (that is, k=5), the values of the weighted coefficients W, may be set as follows:

TABLE 1

Example values of $W_i$

| | |
|---|---|
| $W_1$ | 0.3 |
| $W_2$ | 0.25 |
| $W_3$ | 0.2 |
| $W_4$ | 0.15 |
| $W_5$ | 0.1 |

The weighted moving average 704 for a data tag represented in the batch of raw data 102 can be used to determine whether the data tag value varies by only a small amount across the entire time range represented by the data batch. For example, a delta value representing the upper and lower bounds of a small change can be defined relative to the mean value of the data values, and each value $V_n$ of the data tag can be compared with these upper and lower bounds to determine whether all values V are within the range. That is, for each value $V_n$ of the data tag, the modal analysis component 310 can determine whether the following condition is satisfied:

$$|Vn - \text{Average}| < \text{Delta} \quad (4)$$

where Average is calculated based on equation (3) or another suitable formula for determining an average value. According to condition (4), the data values are assumed to satisfy the Small Change criterion if all the values are within a maximum deviation from the mean value.

Figure 12:
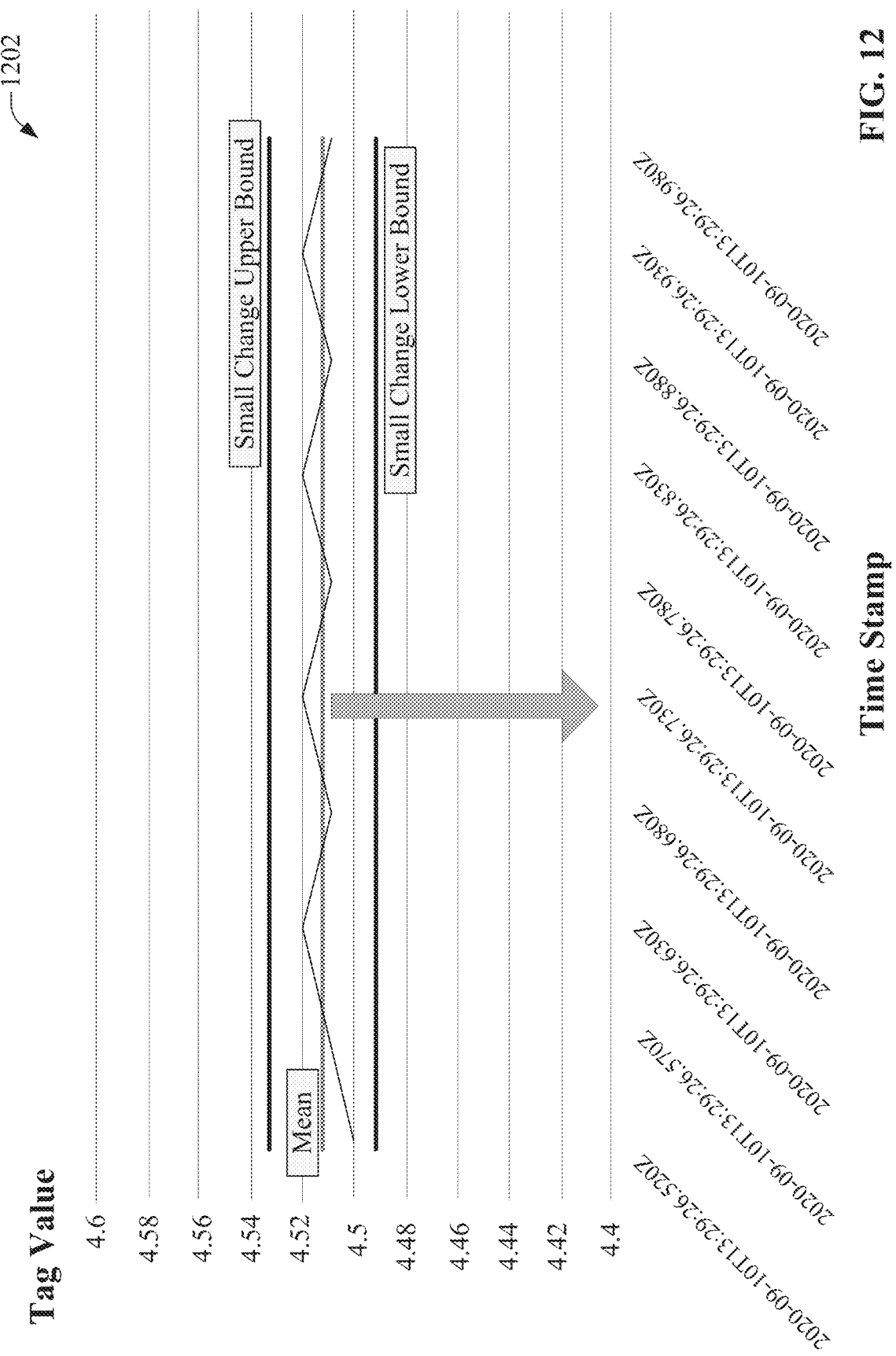
FIG. 12 is a graph of example time-series values of a data tag that invokes a Small Change data reduction strategy.

If modal analysis component 310 determines that the absolute value of the difference between each value $V_n$ of the data tag and the average value is less than the defined delta value, per condition (4), for all n values, the modal analysis component selects and applies the Small Change reduction strategy to the values. FIG. 12 is a graph 1202 of example time-series values of a data tag represented in the raw data 102 that invokes a Small Change data reduction strategy. In this example, the time-series data oscillates around a mean value (represented by the horizontal grey line labeled Mean), which is calculated by the modal analysis component 310 using equation (3) or a variation thereof. The horizontal lines labeled Small Change Upper Bound and Small Change Lower Bound are offset from the Mean line by delta value in the positive and negative y-axis directions, and represent the delta value that determines whether the changes in the time-series data over time are small enough to be classified as a small change. If all values of the data tag remain between the Small Change Upper and Lower Bounds (that is, none of the tag values deviate from the mean in excess of the delta value), the modal analysis component 310 selects the Small Change reduction strategy, which is applied to the raw data 102 by the data reduction component 312. According to the Small Change reduction strategy, the reduced data set 702 includes only the mean value of the data tag together with a time stamp selected from the midpoint or approximate midpoint of the time range, as well as a data tag identifier.

FIG. 13 is a table 1302 of example raw values of the data tag and a table 1304 of the reduced data set 702 after the Small Change reduction strategy is applied. For illustrative purposes, table 1302 also includes columns for the mean value (4.513 in this example) and the absolute value of the difference between each value $V_n$ and the mean. Since each value of the absolute value of the difference between each tag value $V_n$ and the mean is less than the defined delta (0.02 in this example), the mode analysis component applies the Small Change reduction strategy to the data, whereby the reduced data set 702 (represented by table 1304) comprises the mean value of the data (4.513) and a time stamp selected from the midpoint or approximate midpoint of the time range represented by the raw date 102. For the illustrated data sample, this reduces the example data sample comprising ten data points to a single data point.

Figure 14:
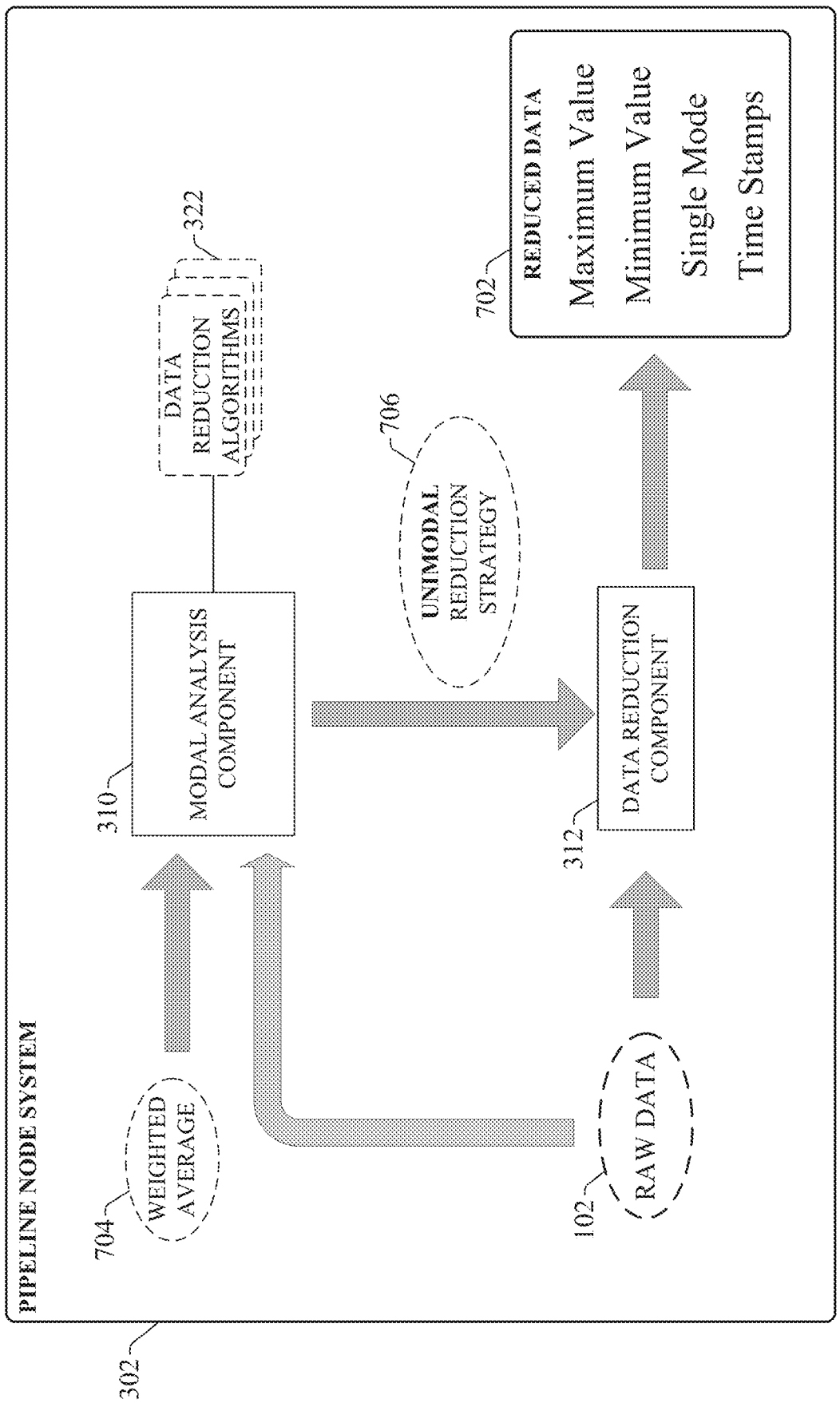
FIG. 14 is a diagram illustrating application of a Unimodal reduction strategy.
Figure 15:
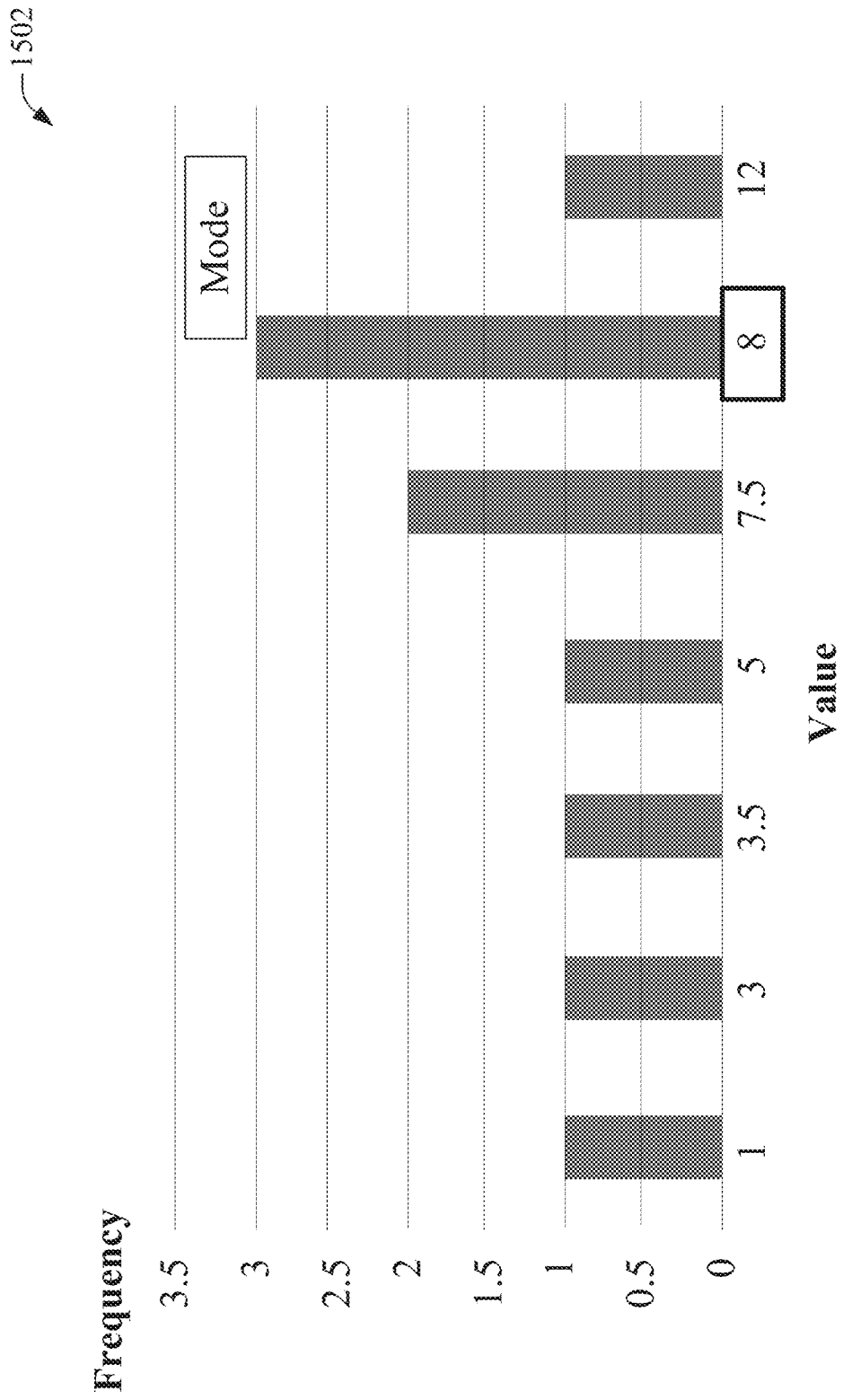
FIG. 15 is a bar chart of a probability distribution for an example set of raw data.

FIG. 14 is a diagram illustrating application of a Unimodal reduction strategy 706. Modal analysis component 310 applies the Unimodal reduction strategy in response to determining that the probability distribution of the data values for the data tag vary in excess of the small change criterion discussed above, and that the distribution has only a single mode. To this end, modal analysis component 310 generates a probability distribution for each data tag in the raw data 102 and identifies the presence of modes within the distribution. FIG. 15 is a bar chart 1502 of a probability distribution for an example set of raw data 102. For a set of data comprising multiple distinct values, the distribution represents the number of occurrences, or frequency, of each distinct value in the raw data 102. As noted above, a mode is a local peak within this distribution, indicating a value that occurs more frequently than its nearest neighbor values. In the example depicted in FIG. 15, a mode corresponding to the value $V_n=8$ is present. This value occurs three times within the raw data 102, more than any of the other values present in the raw data 102. Since this is the only mode present in the data set, modal analysis component 310 selects the Unimodal data reduction strategy, which is applied to the raw data 102 by the data reduction component 312.

Figure 16:
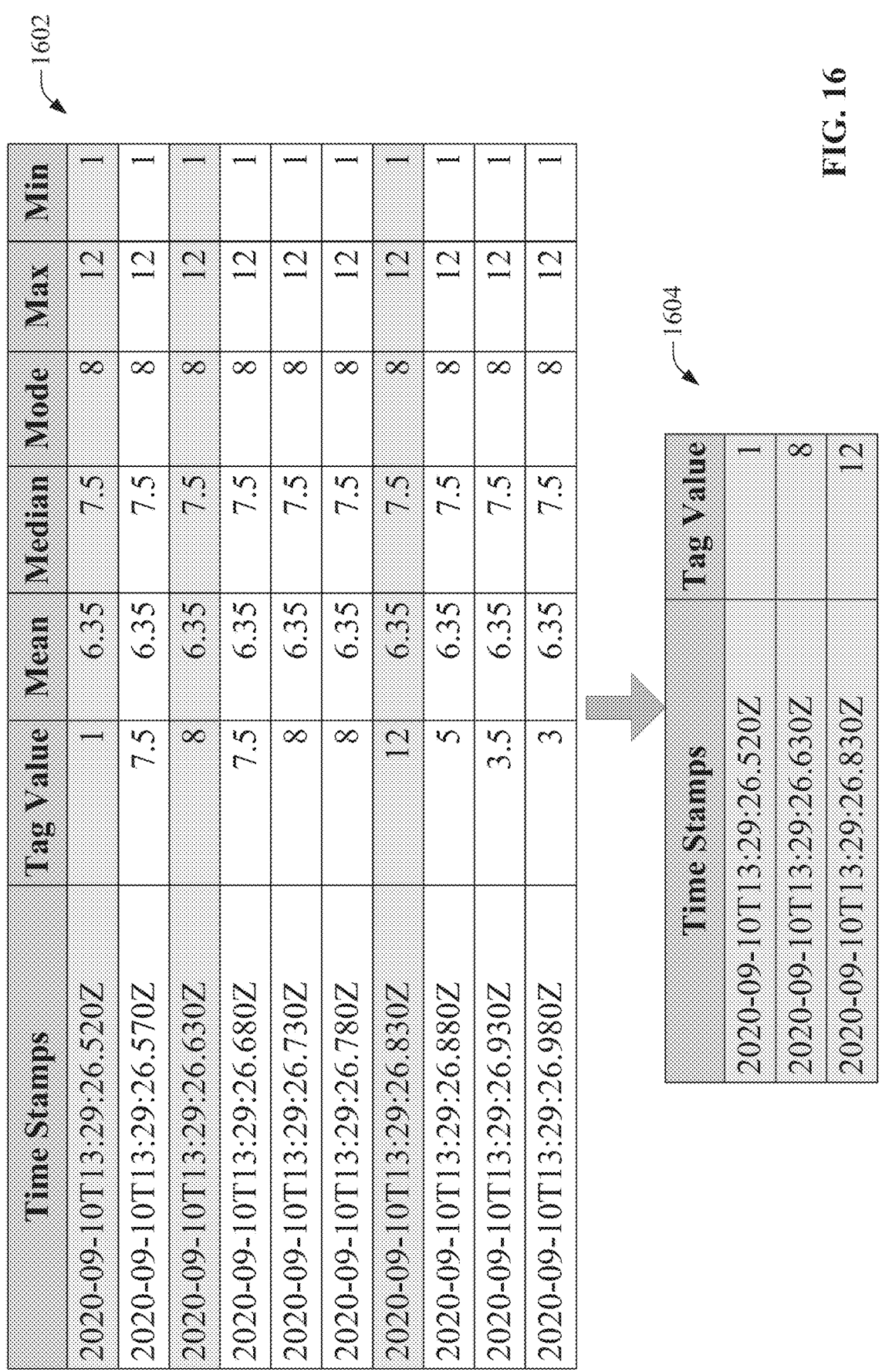
FIG. 16 is a table of example raw values of a data tag and a table of the reduced data set after a Unimodal reduction strategy is applied.

According to the Unimodal data reduction strategy, the reduced data set 702 comprises the maximum value of the data set, the minimum value of the data set, and the mode, together with the time stamps associated with each of these values and a data tag identifier. FIG. 16 is a table 1602 of example raw values of the data tag and a table 1604 of the reduced data set 702 after the Unimodal reduction strategy is applied. For illustrative purposes, table 1602 also includes columns for the mean, median, mode, maximum, and minimum values. As noted above, data records corresponding to the maximum value, minimum value, and mode value—highlighted in table 1602—are selected for inclusion in the reduced data set 702 (represented by table 1604) together with their corresponding time stamps. Although the mode value occurs in the data set multiple times, only one of the data records corresponding to the mode value is selected. In some embodiments, the data reduction component 312 may select an instance of the mode value from the midpoint or approximate midpoint of the occurrences of the mode value, together with its corresponding time stamp, for inclusion in the reduced data set 702. Alternatively, the data reduction component 312 may select the data record corresponding to the first instance in time at which the mode value occurs. Thus, the Unimodal strategy reduces the raw data 102 to three data points in the reduced data set 702.

Figure 17:
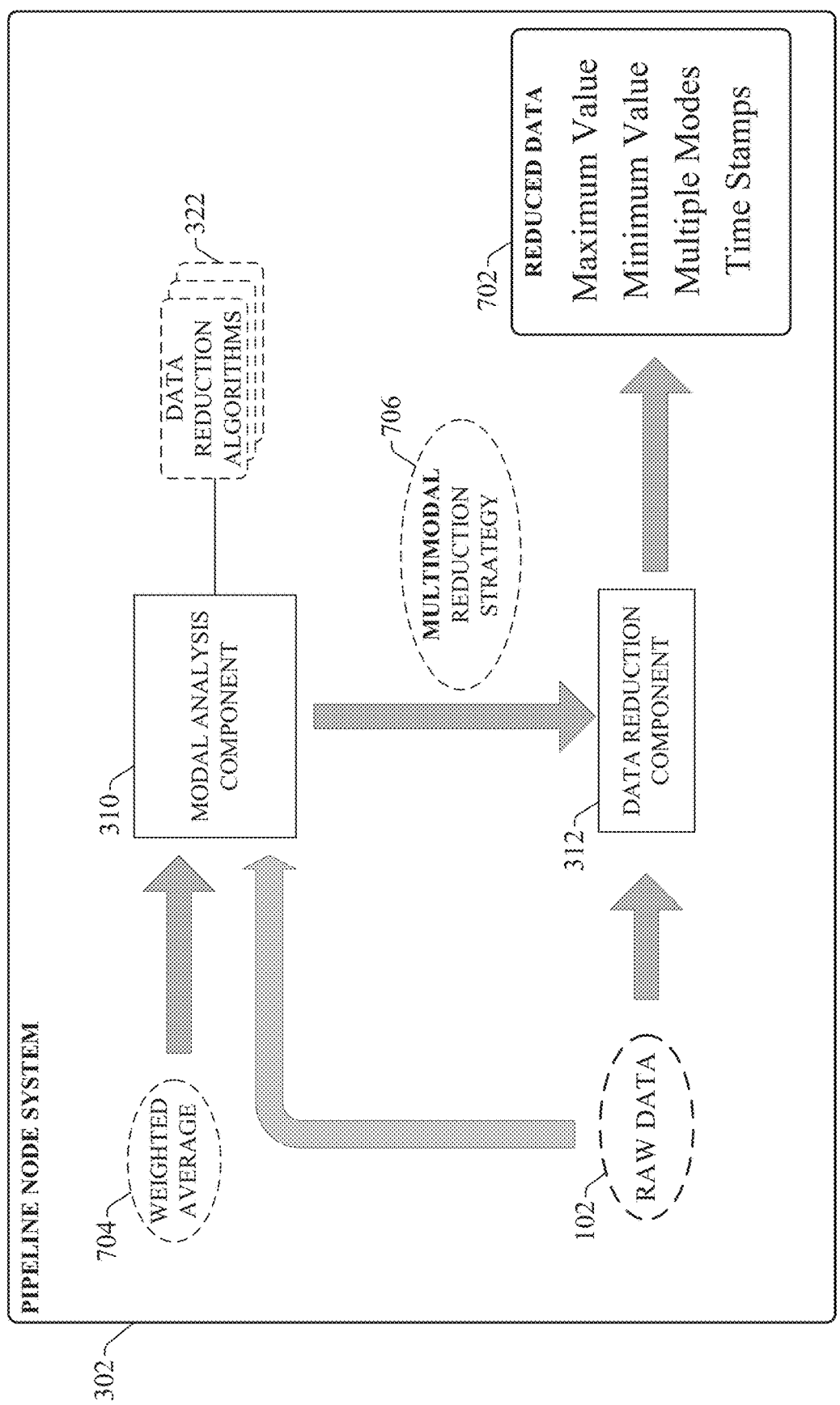
FIG. 17 is a diagram illustrating application of a Multimodal reduction strategy.
Figure 18:
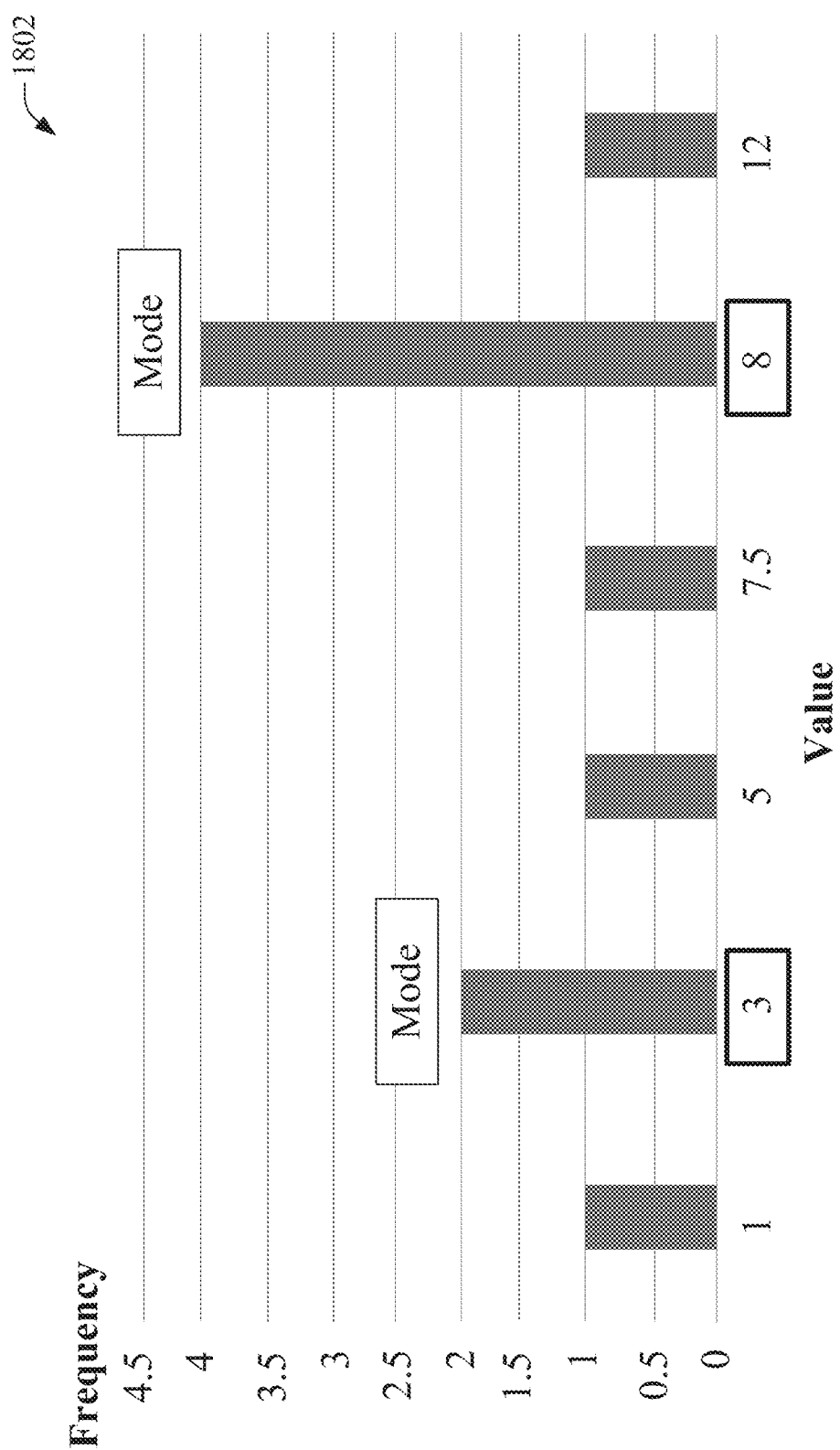
FIG. 18 is a bar chart of a probability distribution for an example set of raw data having two modes (a bimodal distribution).

FIG. 17 is a diagram illustrating application of a Multimodal reduction strategy 706. As in the example unimodal scenario described above, upon determining that the raw data 102 for a data tag does not invoke the No Change or Small Change data reduction strategies, the modal analysis component 310 generates a probability distribution of the raw data and identifies the modes of the resulting distribution. FIG. 18 is a bar chart 1802 of a probability distribution for an example set of raw data 102 having two modes (a bimodal distribution). In this example, the modal analysis component identifies two modes, or local peaks, within the distribution, corresponding to values 3 and 8. In response to determining that more than one mode is present, the modal analysis component 310 selects the Multimodal data reduction strategy, and data reduction component 312 applies this strategy to the raw data 102.

Figure 19:
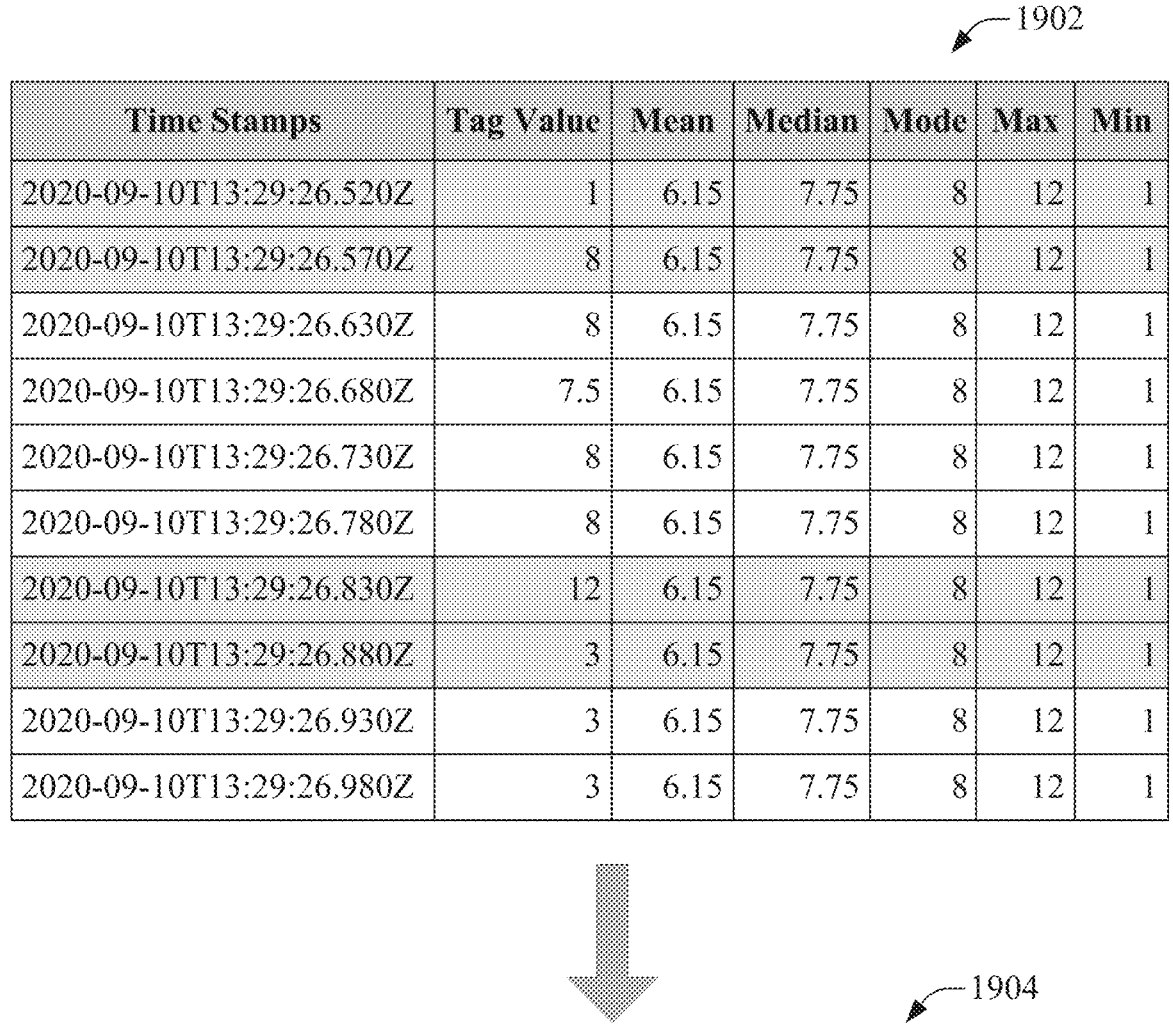
FIG. 19 is a table of example raw values of a data tag and a table of the reduced data set after a Multimodal reduction strategy is applied.

According to the Multimodal data reduction strategy, the reduced data set 702 comprises the maximum and minimum values of the raw data 102, the values corresponding to each of the modes found in the raw data's probability distribution, the time stamps corresponding to each of these data values, and the data tag identifier. FIG. 19 is a table 1902 of example raw values of the data tag and a table 1904 of the reduced data set 702 after the Multimodal reduction strategy is applied. For illustrative purposes, table 1902 also includes columns for the mean value, the median value, the most frequent mode value, the maximum value, and the minimum value. In this bimodal example, data reduction component 312 selects, for inclusion in the reduced data set 702, the highlighted data records corresponding to the maximum value (12), the minimum value (1), and the values associated with the two modes (8 and 3), as well as the time stamps corresponding to each of these values. As in the Unimodal scenario, the mode values selected for inclusion in the reduced data set 702 can comprise the mode values in the midpoint or approximate midpoint of the range of corresponding mode values. Alternatively, the selected mode values may be the instances of the respective mode values that occur earliest in time. In this bimodal example, the reduced data set 702 (represented by table 1904) comprises four data points. However, if more than two modes are present, the reduced data set 702 will include additional data values so that each mode is represented.

Figure 20:
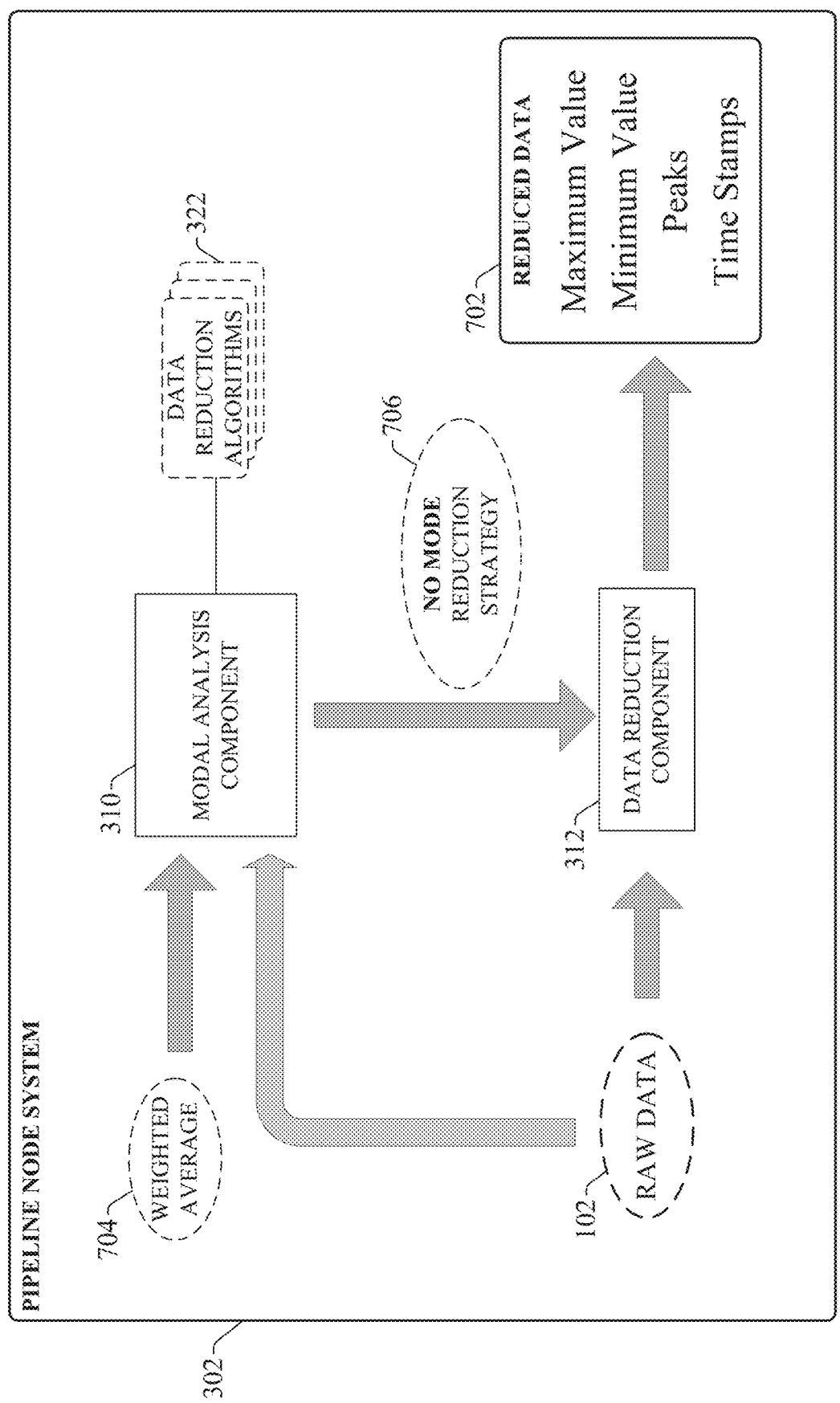
FIG. 20 is a diagram illustrating application of a No Mode reduction strategy.

The node system 302 may also define a data reduction strategy for scenarios in which the raw data 102 does not satisfy the No Change or Small Change criteria, but also does not have a mode. FIG. 20 is a diagram illustrating application of such a No Mode reduction strategy 706. In response to determining that the raw data 102 for a data tag does not invoke the No Change or Small Change data reduction strategies, the modal analysis component 310 generates a probability distribution of the raw data, as in the Unimodal and Multimodal scenarios. In this example, however, the modal analysis component 310 detects no mode within the resulting distribution. This may the case, for example, in sets of raw data 102 whose values vary constantly with no repeating values across the entire time range represented by the data batch, as in the example data set depicted in FIGS. 5*a* and 5*b*.

Figure 21:
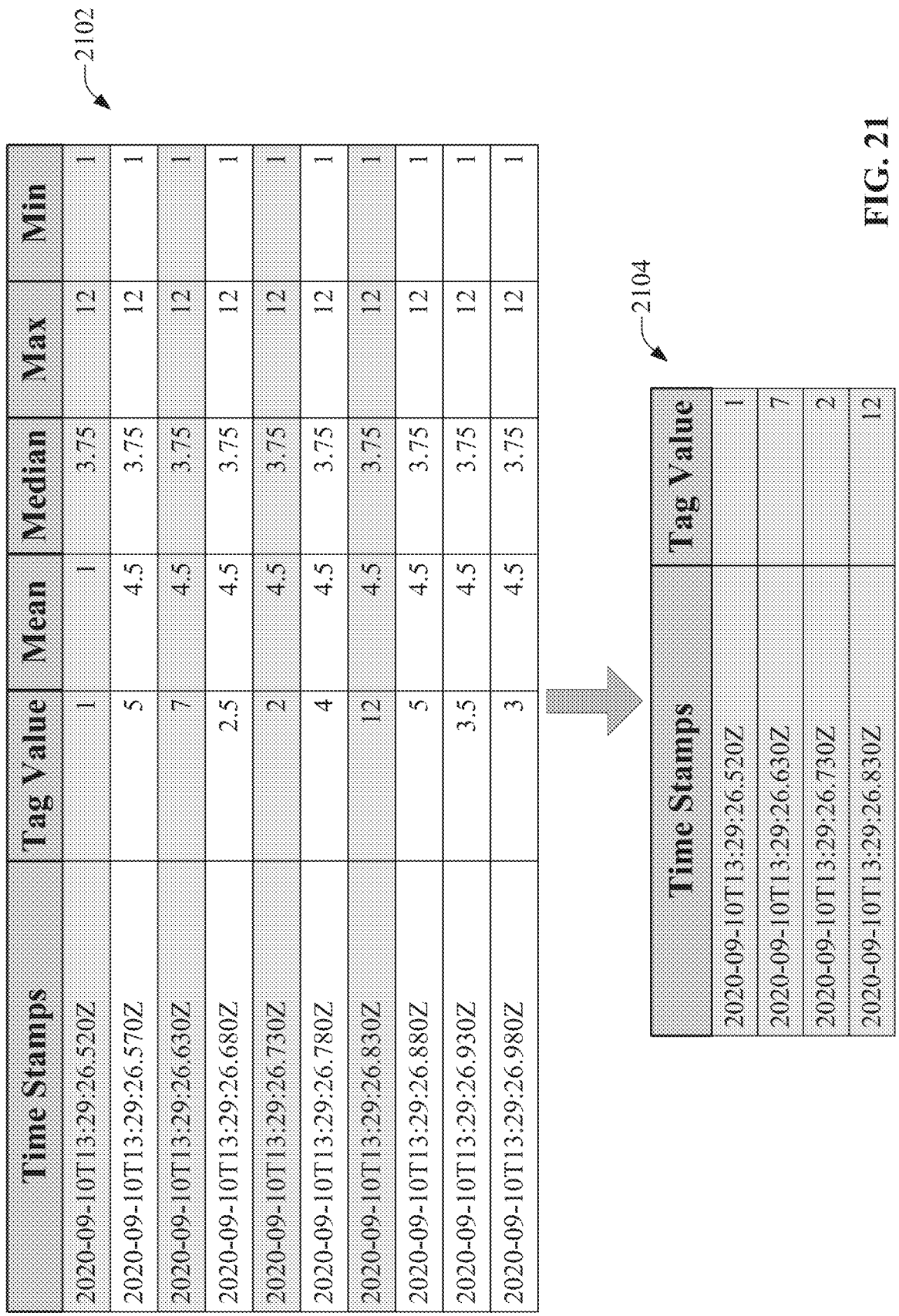
FIG. 21 is a table of example raw values of a data tag and a table of the reduced data set after a No Mode reduction strategy is applied.

In response to determining that no modes are present in raw data's distribution, the modal analysis component 310 selects the No Mode data reduction strategy, and the data reduction component 312 applies the selected strategy to the raw data 102. According to the No Mode reduction strategy, the reduced data set 702 comprises the maximum value, the minimum value, any local peak and/or local valley values contained in the raw data 102, the time stamps corresponding to these values, and data tag identifier. FIG. 21 is a table 2102 of example raw values of the data tag (with columns including the mean, median, maximum, and minimum values added for illustrative purposes) and a table 2104 of the reduced data set 702 after the No Mode reduction strategy is applied. The example raw data in this example corresponds to graph 508 illustrated in FIG. 5*b*. In this example, the reduced data set 702 represented by table 2104 includes the maximum and minimum values (12 and 1) of the raw data 102 included in the current batch, as well as a local peak (7) and a local valley (2) (the data records highlighted in table 2102). In some embodiments, the No Mode strategy may only include the maximum, minimum, and local peaks— omitting the local valleys—if only the peaks are of interest to the cloud-side applications. In yet other embodiments, the No Mod strategy may include the maximum, minimum, and local valleys, omitting the peaks.

Figure 22:
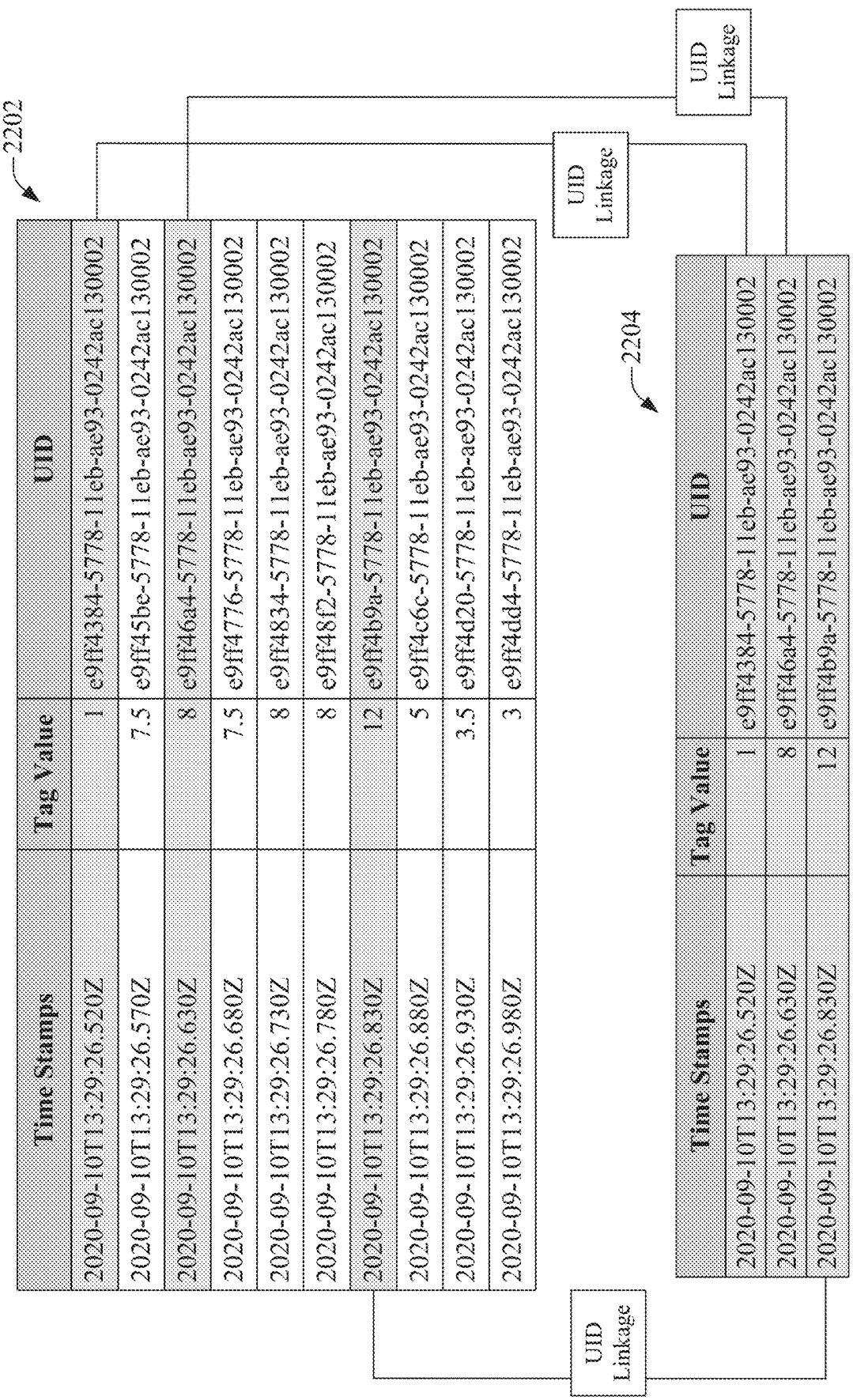
FIG. 22 depicts a table representing an example set of raw data and a table depicting a reduced data set that has been generated based on a selected data reduction strategy.

As noted above, in addition to reducing the raw data 102 in accordance with the data reduction strategy selected by the modal analysis component 310, the data reduction component 312 also defines an association between each item of the reduced data set 702 and the subset of the raw data 102 surrounding the data item. FIG. 22 depicts a table 2202 representing an example set of raw data and a table 2204 depicting a reduced data set that has been generated by the data reduction component 312 based on a selected data reduction strategy. In addition to creating the reduced data set represented by table 2204, the data reduction component 312 also defines associations or linkages between each data record of the reduced data set (table 2204) and its corresponding record in the raw data set (table 2202). To this end, the data reduction component 312 can generate and add a unique identifier (UID) to each item of raw data (the UID column in table 2202). The UID uniquely identifies its corresponding item of raw, such that the UID for a given item of raw data is unique to that data item. When an item of the raw data is selected for inclusion in the reduced data set, the UID for the selected data item is copied with the data item to the reduced data set and maintains its association with the data record. This creates a linkage between each data record in the reduced data set and its corresponding data record in the raw data set by virtue of the common UID between the two records. These linkages are represented by the lines in FIG. 22 that connect each data record in table 2204 with its corresponding data record in table 2202.

Figure 23:
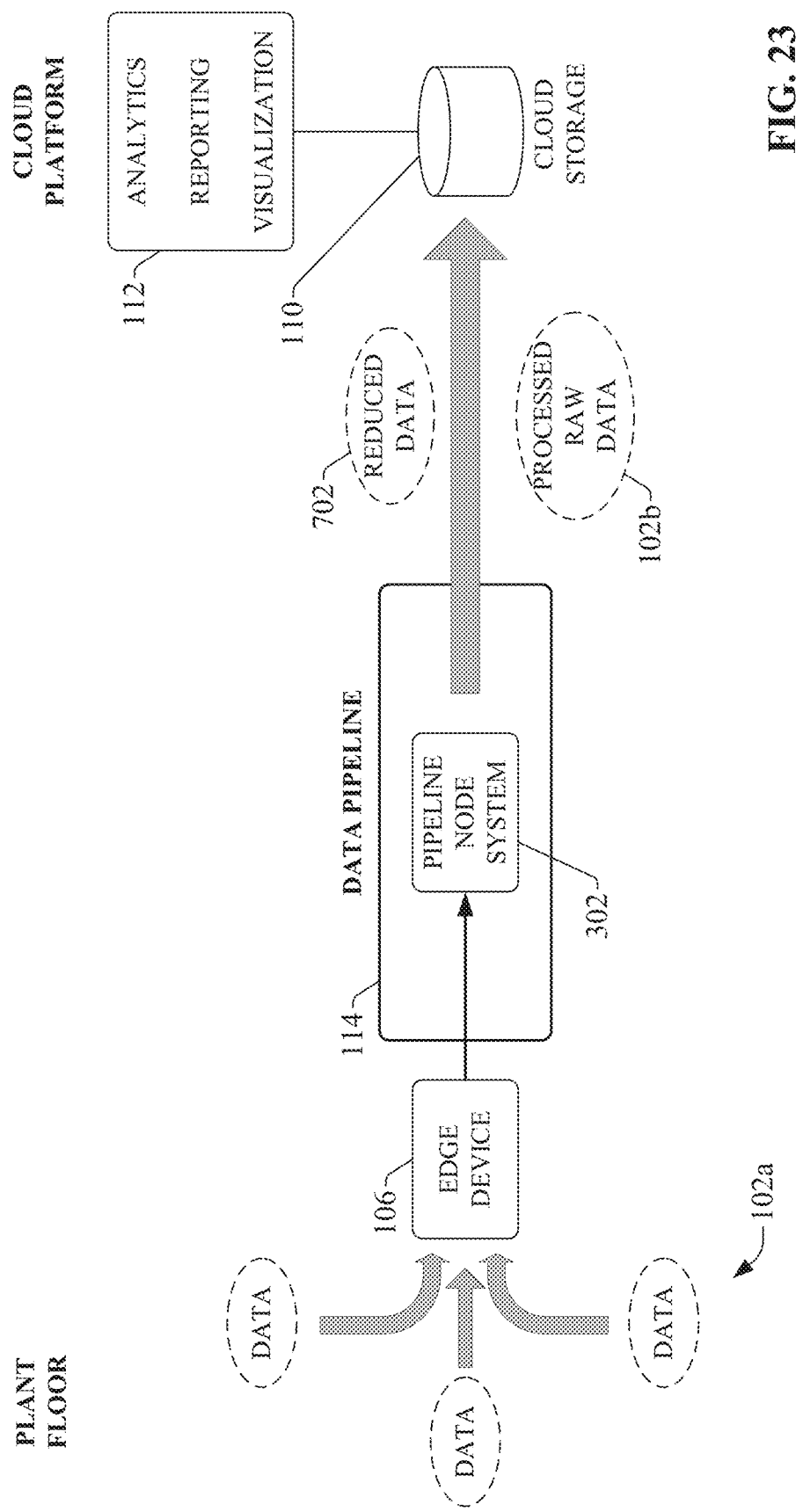
FIG. 23 is a diagram illustrating an example IIoT data pipeline architecture that includes at least one pipeline node system as part of the pipeline backbone.

FIG. 23 is a diagram illustrating an example IIoT data pipeline architecture that includes at least one pipeline node system 302 as part of the pipeline backbone. As in the example architecture depicted in FIG. 1, an edge device 106 that interfaces the industrial devices on the plant floor with the data pipeline 114 collects raw data 102*a* from the industrial devices and feeds the data into the pipeline 114 via node system 302. Either the node system 302 or the edge device 106 can pre-process the raw data 102*a*—e.g., by removing outlier data or non-numerical data, sorting the data 102*a* according to time stamps, etc.—to yield processed raw data 102*b*. The node system 302 or the edge device 106 can also select and apply a suitable data reduction algorithm based on analysis of the raw data 102*b* to yield a reduced data set 702, as discussed in previous examples. The data reduction component 312 of either the pipeline node system 302 or the edge device 106 also defines associative links between each item of the reduced data set 702 and its corresponding data item in the raw data 102*b*. Both the reduced data asset 702 and the processed raw data 102*b* are then conveyed by the node system 302 (by the data output component 306) to the final storage destination for the data, together with the defined associations between the reduced data set 702 and the raw data 102*b*. In this example, the data is streamed to cloud storage 110 for storage and consumption by cloud-based applications 112 (e.g., visualization, reporting, or analytics applications).

Figure 24:
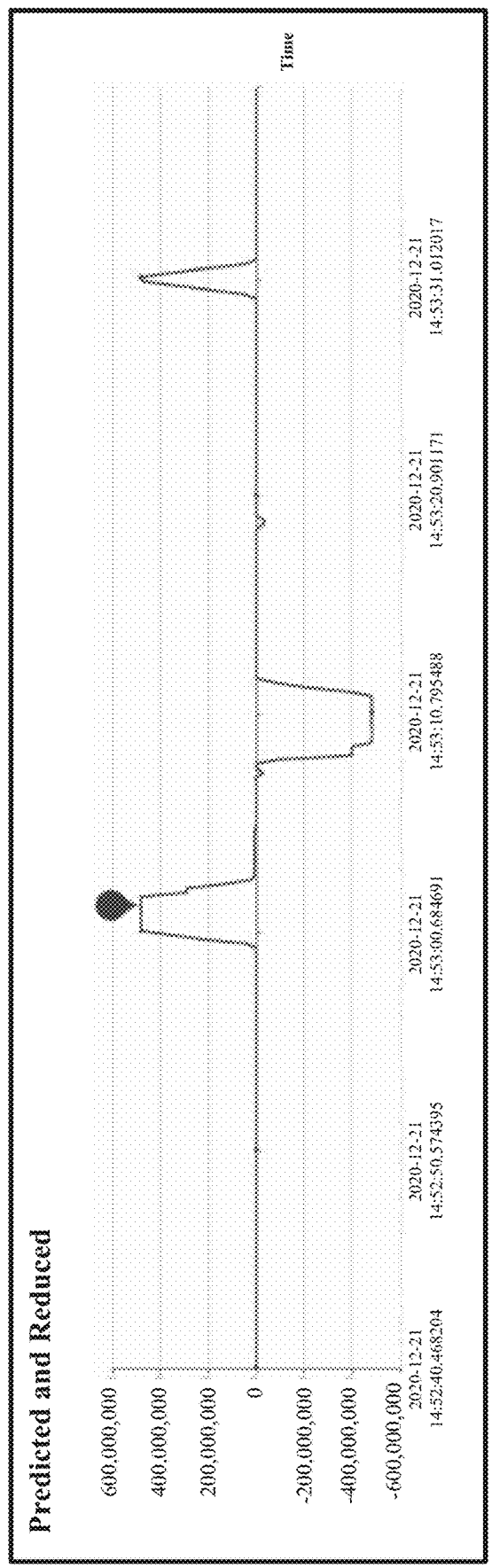
FIG. 24 is a screenshot of an example graph that can be rendered by a visualization application based on a reduced data set.

In the case of visualization applications that provide graphical or alphanumeric views of the collected data, the defined associations or links between the reduced data set 702 and the raw data 102*b* can allow users to switch between a high-level overview populated by the reduced data set 702 and a more detailed view populated by the raw data 102. FIG. 24 is a screenshot of an example graph 2402 that can be rendered by a visualization application based on the reduced data set 702. This graph conveys time-series values of a data tag as a line on the graph 2402, which is drawn based on the values of the reduced data set 702. Since the graph 2402 is plotted based on the reduced data set 702, which omits values from deemed less significant, only the most significant values are plotted. This results in a plot that is free of noise that would otherwise be present if all time-series values from the raw data 102 were plotted.

Figure 25:
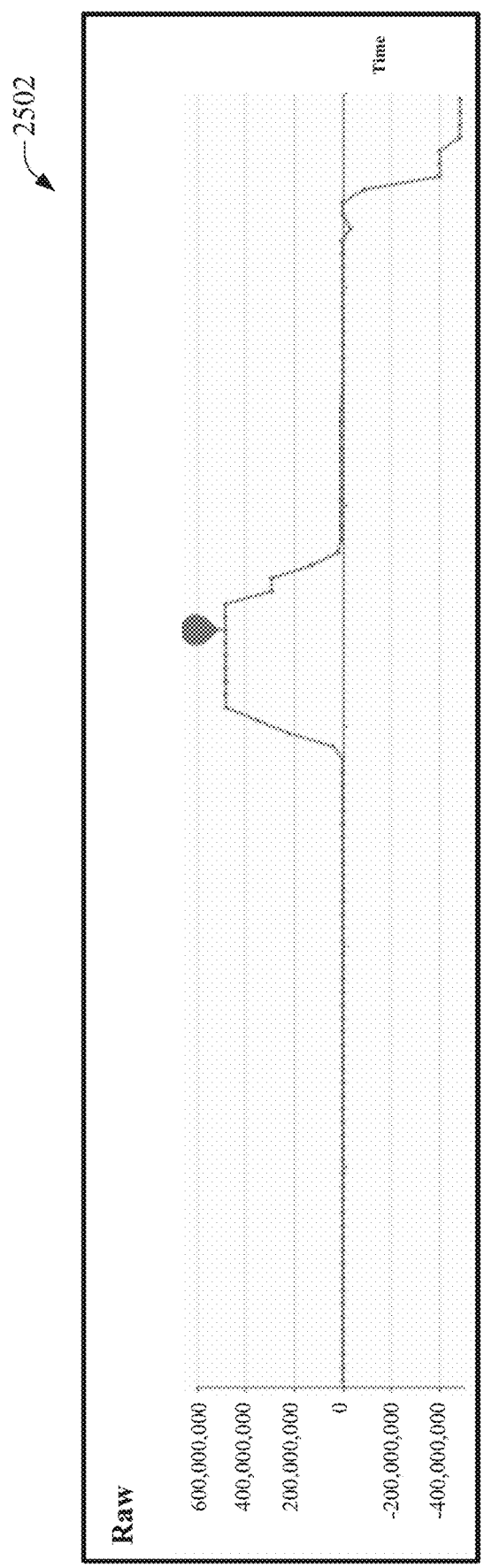
FIG. 25 is an example detail screen populated by raw industrial data.

Since the raw data 102 is also stored on the cloud platform together with defined associations between the reduced data set 702 and the raw data 102, the user can also drill down to a more detailed view for any point in time represented in the graph 2402. FIG. 25 is an example graph 2502 that can be invoked by the user. Graph 2502 plots the raw data 102 corresponding to the reduced data 702, thereby allowing the user to view the values of the data tags at a more granular level (e.g., at a higher time density). The raw data 102 can be visualized in any suitable format depending on the type of visualization application that renders the data (e.g., as a bar chart, a list of alphanumeric values, etc.). In an example scenario, the user can invoke the graph 2502 by selecting a point on the graph 2402, which invokes a version of the data that includes the selected data point and the records of the raw data 102 in temporal proximity to the selected data point.

The IIoT data reduction approach implemented by embodiments of the node system 302 described herein can intelligently filter sets of raw industrial data in a manner that maintains the most critical data, as determined based on analysis of the data's probability distribution. In contrast to approaches that apply the same data reduction algorithm to all data batches, the approach described herein can maintain data consistency and accuracy of the reduced data set while also retaining associations with the corresponding raw data.

FIGS. 26*a*-26*e* illustrate a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

In some embodiments, the methodology depicted in FIGS. 26*a*-26*e* can be performed for each data transmission cycle of a reactive node of an IIoT data pipeline.

Figure 26A:
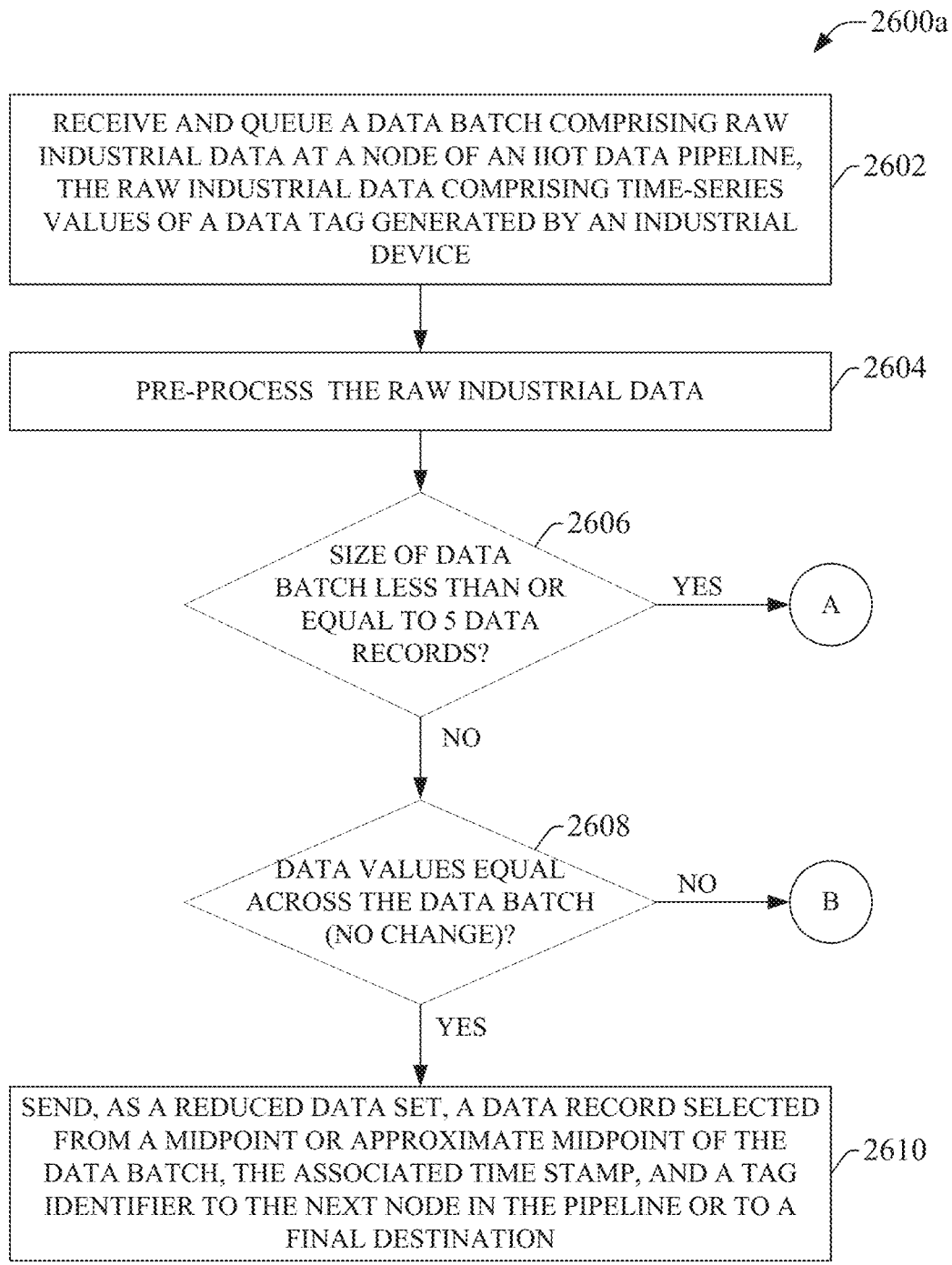
FIG. 26a is a flowchart of a first part of an example methodology for generating a reduced data batch from a raw data batch comprising industrial data collected from industrial devices on a plant floor.
Figure 26B:
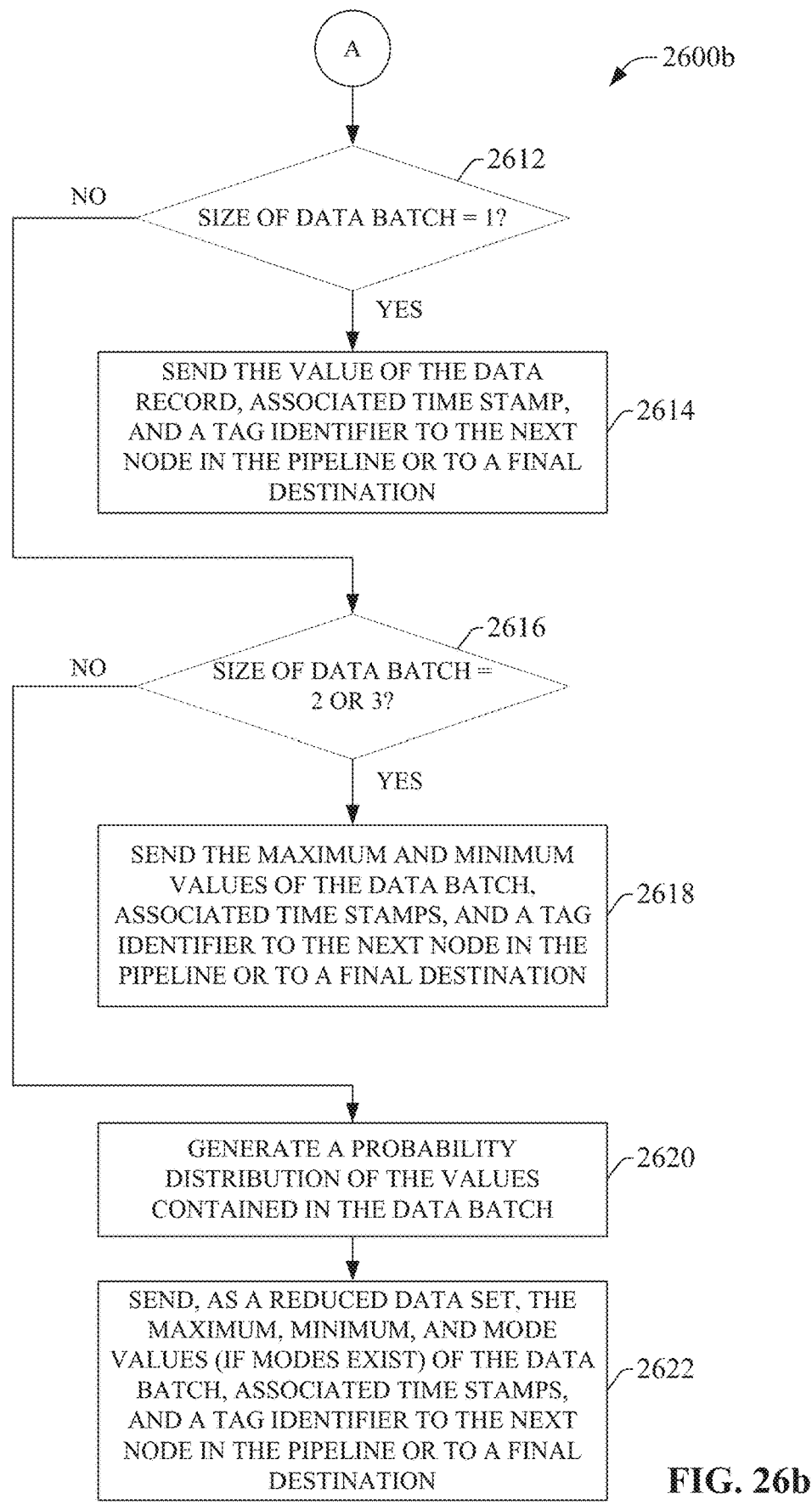
FIG. 26b is a flowchart of a second part of the example methodology for generating a reduced data batch from a raw data batch comprising industrial data collected from industrial devices on a plant floor.
Figure 26C:
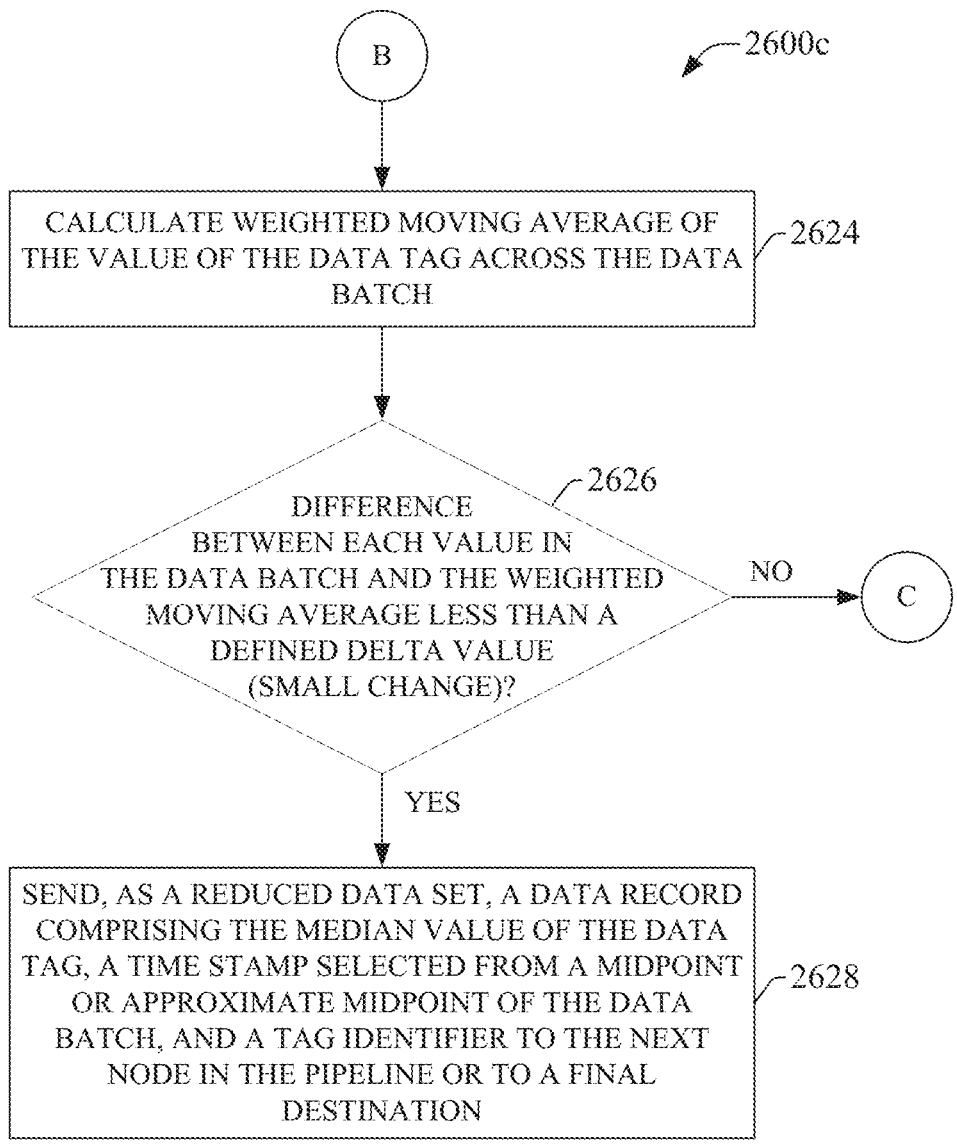
FIG. 26c is a flowchart of a third part of the example methodology for generating a reduced data batch from a raw data batch comprising industrial data collected from industrial devices on a plant floor.
Figure 26D:
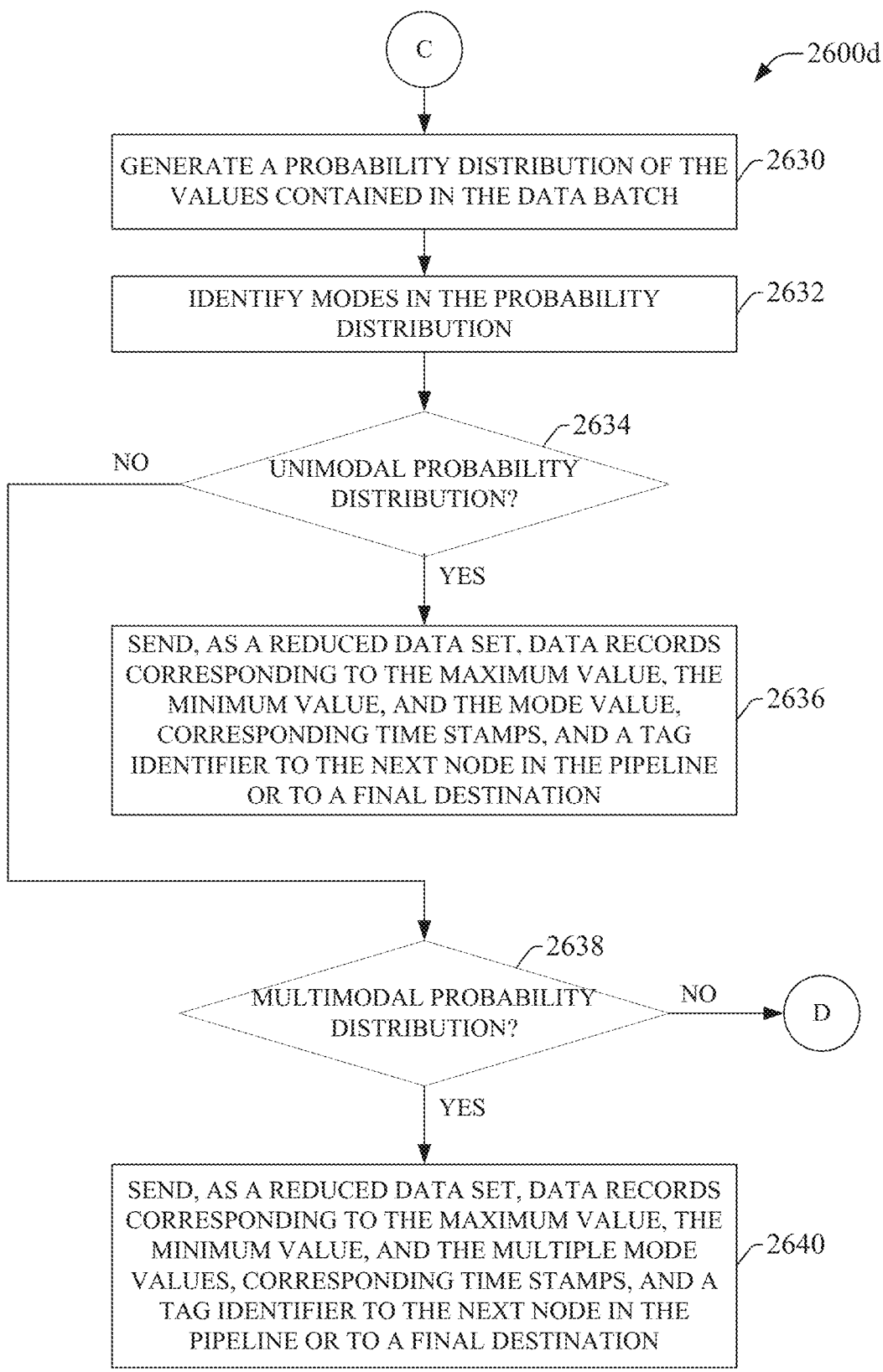
FIG. 26d is a flowchart of a fourth part of the example methodology for generating a reduced data batch from a raw data batch comprising industrial data collected from industrial devices on a plant floor.

FIG. 26*a* illustrates a first part of an example methodology 2600*a* for generating a reduced data set from a raw data batch comprising industrial data collected from industrial devices on a plant floor. Initially, at 2602, a data batch is received and queued at a node of an IIoT data pipeline (or an edge device that feeds industrial data into the data pipeline). The data batch comprises time-series values of a data tag generated by an industrial device in a plant facility. At 2604, the raw industrial data is pre-processed; e.g., by removing outlier data, removing non-numerical data, organizing or sorting the data according to time stamp, etc.

At 2606, a determination is made as to whether the size of the data batch is less than or equal to five data records. If the size of the data batch is less than or equal to five (YES at step 2606), the methodology proceeds to the second part 2600*b* illustrated in FIG. 26*b*. At 2612, a determination is made as to whether the data batch comprises only one data record. If the batch contains only one data record (YES at step 2612), the methodology proceeds to step 2614, where the value of the single data item, its associated time stamp, and its tag identifier are sent to the next node in the pipeline or to a final destination (e.g., cloud platform storage). Alternatively, if the data batch contains more than one data record (NO at step 2612), the methodology proceeds to step 2616, where a determination is made as to whether the data batch contains 2-3 data items. If the data batch contains 2-3 data records (YES at step 2616), the methodology proceeds to step 2618, where the maximum value and the minimum value contained in the data batch, as well as their associated time stamps and a tag identifier, are sent to the next node or the final destination. Alternatively, if the size of the data batch is greater than three (that is, the batch contains 4 or 5 data records) (NO at step 2616), the methodology proceeds to step 2620, where a probability distribution of the values contained in the data batch is generated. Then, at 2622, the node sends, as a reduced data set, the maximum, minimum, and mode values (if mode values exist) contained in the data batch (where the mode value is determined based on the probability distribution generated at step 2620), as well as the time stamps associated with those values and a tag identifier.

Returning to the first part of the methodology 2600*a* illustrated in FIG. 26*a*, if the size of the data batch is greater than five data records (NO at step 2606), the methodology proceeds to step 2608, where a determination is made as to whether the data values are equal across the entire data batch (e.g., the maximum value is equal to the minimum values). If the value of the data tag is constant across the entire data batch (YES at step 2608), the methodology proceeds to step 2610, where the node sends, as a reduced data set, a data record selected from a midpoint or approximate midpoint in time of the data batch, as well as the time stamp associated with this data record and a tag identifier to the next node in the pipeline or to the final destination (the No Change data reduction strategy). Alternatively, if the data values are not equal across the entire batch (NO at step 2608), the methodology proceeds to the third part 2600c illustrated in FIG. 26c.

At 2624, a weighted moving average of the value of the data tag across the data batch is calculated (e.g., using equation (3) or a variation thereof). At 2626, a determination is made as to whether the difference between each value in the data batch and the weighted moving average calculated at step 2624 is less than a defined delta. If so (YES at step 2626), the methodology proceeds to step 2628, where the node sends, as a reduced data set, a data record comprising the median value of the data tag, a time stamp selected from a midpoint or approximate midpoint of the data batch, and a tag identifier to the next node or the final destination (the Small Change data reduction strategy). Alternatively, if the difference between any of the values in the data batch and the weighted moving average is greater than the defined delta value (NO at step 2626), the methodology proceeds to the fourth part 2600d illustrated in FIG. 26d.

At 2630, a probability distribution of the values contained in the data batch is generated. At 2632, any modes in the probability distribution are identified. At 2634, a determination is made as to whether the probability distribution is unimodal. If the probability distribution is unimodal (YES at step 2634), the methodology proceeds to step 2636, where the node sends, as a reduced data batch, data records from the raw data batch corresponding to the maximum value, the minimum value, and the single mode value, as well as the time stamps corresponding to these data items and a tag identifier, to the next node or the final destination (the Unimodal data reduction strategy).

Alternatively, if the probability distribution is not unimodal (NO at step 2634), the methodology proceeds to step 2638, where a determination is made as to whether the probability distribution is multimodal. If the probability distribution is multimodal (YES at step 2638), the methodology proceeds to step 2640, where the node sends, as a reduced data set, the data records from the raw data set corresponding to the maximum value, the minimum value, and each of the multiple mode values, as well as time stamps corresponding to each of these data records and a tag identifier, to the next node or the final destination (the Multimodal data reduction strategy).

Figure 26E:
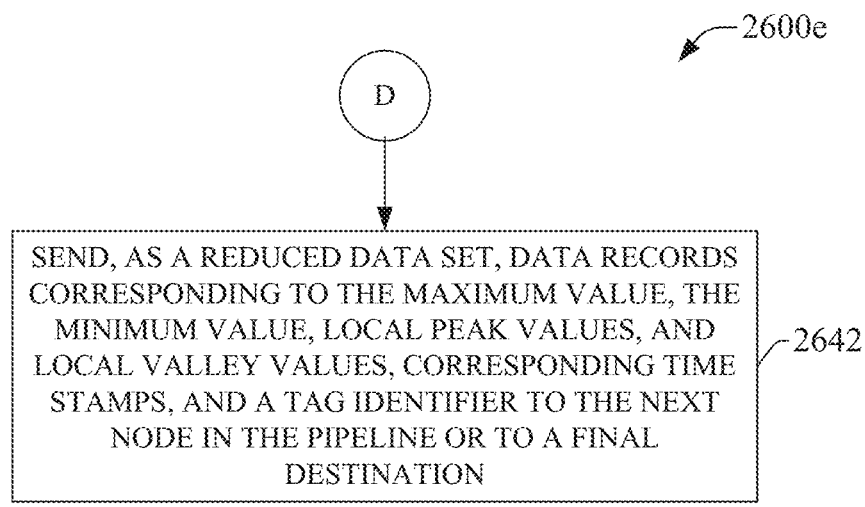
FIG. 26e is a flowchart of a fifth part of the example methodology for generating a reduced data batch from a raw data batch comprising industrial data collected from industrial devices on a plant floor.

Alternatively, if the probability distribution is not multimodal (NO at step 2638), the methodology proceeds to the fifth part 2600e illustrated in FIG. 26e. At 2642, the node sends, as a reduced data set, data records from the raw data set corresponding to the maximum value, the minimum value, any local peak values, and any local valley values, as well as the time stamps corresponding to these data records and a tag identifier, to the next node or the final destination.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 27:
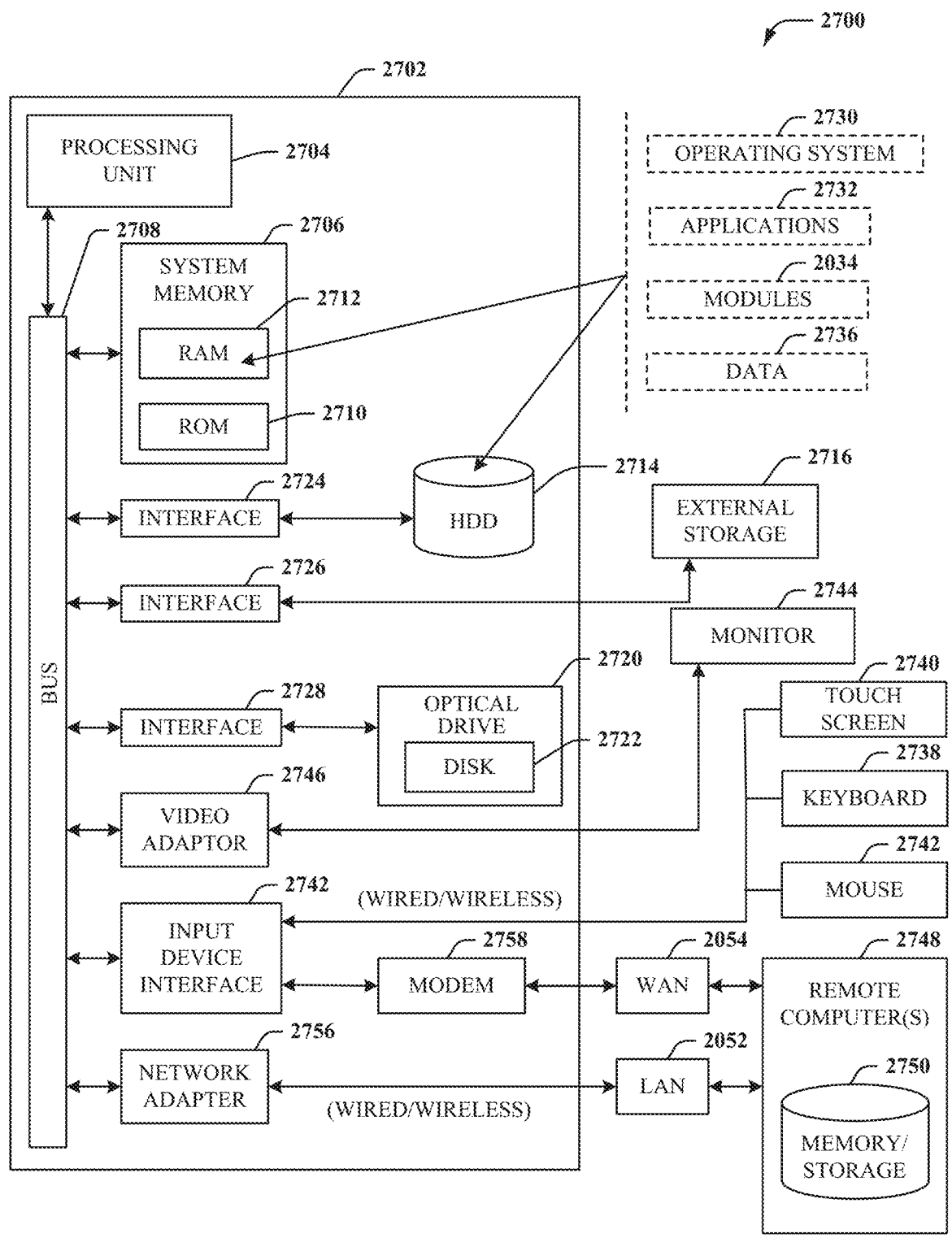
FIG. 27 is an example computing environment.
Figure 28:
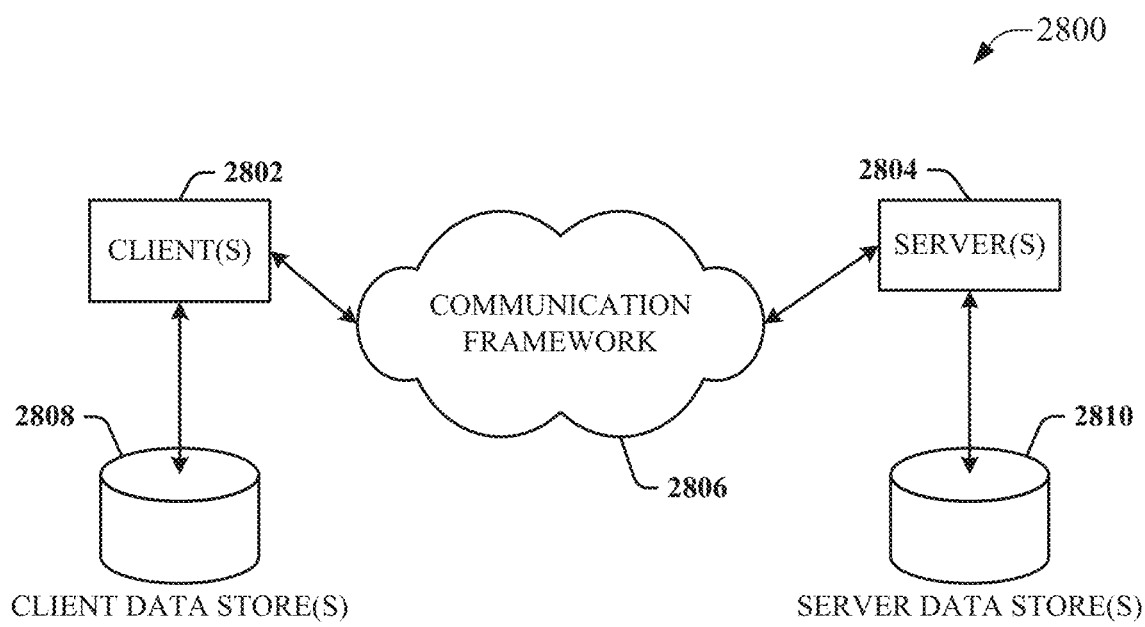
FIG. 28 is an example networking environment.

In order to provide a context for the various aspects of the disclosed subject matter, FIGS. 27 and 28 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 27 the example environment 2700 for implementing various embodiments of the aspects described herein includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors. Dual microprocessors and other multi-processor architectures can also be employed as the processing unit 2704.

The system bus 2708 can be any of several types of bus structure that can further interconnect to a memory bus (with or without a memory controller), a peripheral bus, and a local bus using any of a variety of commercially available bus architectures. The system memory 2706 includes ROM 2710 and RAM 2712. A basic input/output system (BIOS) can be stored in a non-volatile memory such as ROM, erasable programmable read only memory (EPROM), EEPROM, which BIOS contains the basic routines that help to transfer information between elements within the computer 2702, such as during startup. The RAM 2712 can also include a high-speed RAM such as static RAM for caching data.

The computer 2702 further includes an internal hard disk drive (HDD) 2714 (e.g., EIDE, SATA), one or more external storage devices 2716 (e.g., a magnetic floppy disk drive (FDD) 2716, a memory stick or flash drive reader, a memory card reader, etc.) and an optical disk drive 2720 (e.g., which can read or write from a CD-ROM disc, a DVD, a BD, etc.). While the internal HDD 2714 is illustrated as located within the computer 2702, the internal HDD 2714 can also be configured for external use in a suitable chassis (not shown). Additionally, while not shown in environment 2700, a solid state drive (SSD) could be used in addition to, or in place of, an HDD 2714. The HDD 2714, external storage device(s) 2716 and optical disk drive 2720 can be connected to the system bus 2708 by an HDD interface 2724, an external storage interface 2726 and an optical drive interface 2728, respectively. The interface 2724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2712, including an operating system 2730, one or more application programs 2732, other program modules 2734 and program data 2736. All or portions of the operating system, applications, modules, and/or data can also be cached in the RAM 2712. The systems and methods described herein can be implemented utilizing various commercially available operating systems or combinations of operating systems.

Computer 2702 can optionally comprise emulation technologies. For example, a hypervisor (not shown) or other intermediary can emulate a hardware environment for operating system 2730, and the emulated hardware can optionally be different from the hardware illustrated in FIG. 27. In such an embodiment, operating system 2730 can comprise one virtual machine (VM) of multiple VMs hosted at computer 2702. Furthermore, operating system 2730 can provide runtime environments, such as the Java runtime environment or the .NET framework, for application programs 2732. Runtime environments are consistent execution environments that allow application programs 2732 to run on any operating system that includes the runtime environment. Similarly, operating system 2730 can support containers, and application programs 2732 can be in the form of containers, which are lightweight, standalone, executable packages of software that include, e.g., code, runtime, system tools, system libraries and settings for an application.

Further, computer 2702 can be enable with a security module, such as a trusted processing module (TPM). For instance with a TPM, boot components hash next in time boot components, and wait for a match of results to secured values, before loading a next boot component. This process can take place at any layer in the code execution stack of computer 2702, e.g., applied at the application execution level or at the operating system (OS) kernel level, thereby enabling security at any level of code execution.

A user can enter commands and information into the computer 2702 through one or more wired/wireless input devices, e.g., a keyboard 2738, a touch screen 2740, and a pointing device, such as a mouse 2742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2704 through an input device interface 2744 that can be coupled to the system bus 2708, but can be connected by other interfaces, such as a parallel port, an IEEE 1394 serial port, a game port, a USB port, an IR interface, a BLUETOOTH® interface, etc.

A monitor 2744 or other type of display device can be also connected to the system bus 2708 via an interface, such as a video adapter 2746. In addition to the monitor 2744, a computer typically includes other peripheral output devices (not shown), such as speakers, printers, etc.

The computer 2702 can operate in a networked environment using logical connections via wired and/or wireless communications to one or more remote computers, such as a remote computer(s) 2748. The remote computer(s) 2748 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory/storage device 2750 is illustrated. The logical connections depicted include wired/wireless connectivity to a local area network (LAN) 2752 and/or larger networks, e.g., a wide area network (WAN) 2754. Such LAN and WAN networking environments are commonplace in offices and companies, and facilitate enterprise-wide computer networks, such as intranets, all of which can connect to a global communications network, e.g., the Internet.

When used in a LAN networking environment, the computer 2702 can be connected to the local network 2752 through a wired and/or wireless communication network interface or adapter 2756. The adapter 2756 can facilitate wired or wireless communication to the LAN 2752, which can also include a wireless access point (AP) disposed thereon for communicating with the adapter 2756 in a wireless mode.

When used in a WAN networking environment, the computer 2702 can include a modem 2758 or can be connected to a communications server on the WAN 2754 via other means for establishing communications over the WAN 2754, such as by way of the Internet. The modem 2758, which can be internal or external and a wired or wireless device, can be connected to the system bus 2708 via the input device interface 2742. In a networked environment, program modules depicted relative to the computer 2702 or portions thereof, can be stored in the remote memory/storage device 2750. It will be appreciated that the network connections shown are example and other means of establishing a communications link between the computers can be used.

When used in either a LAN or WAN networking environment, the computer 2702 can access cloud storage systems or other network-based storage systems in addition to, or in place of, external storage devices 2716 as described above. Generally, a connection between the computer 2702 and a cloud storage system can be established over a LAN 2752 or WAN 2754 e.g., by the adapter 2756 or modem 2758, respectively. Upon connecting the computer 2702 to an associated cloud storage system, the external storage interface 2726 can, with the aid of the adapter 2756 and/or modem 2758, manage storage provided by the cloud storage system as it would other types of external storage. For instance, the external storage interface 2726 can be configured to provide access to cloud storage sources as if those sources were physically connected to the computer 2702.

The computer 2702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 28 is a schematic block diagram of a sample computing environment 2800 with which the disclosed subject matter can interact. The sample computing environment 2800 includes one or more client(s) 2802. The client(s) 2802 can be hardware and/or software (e.g., threads, processes, computing devices). The sample computing environment 2800 also includes one or more server(s) 2804. The server(s) 2804 can also be hardware and/or software (e.g., threads, processes, computing devices). The servers 2804 can house threads to perform transformations by employing one or more embodiments as described herein, for example. One possible communication between a client 2802 and servers 2804 can be in the form of a data packet adapted to be transmitted between two or more computer processes. The sample computing environment 2800 includes a communication framework 2806 that can be employed to facilitate communications between the client(s) 2802 and the server(s) 2804. The client(s) 2802 are operably connected to one or more client data store(s) 2808 that can be employed to store information local to the client(s) 2802. Similarly, the server (s) 2804 are operably connected to one or more server data store(s) 2810 that can be employed to store information local to the servers 2804.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A node system, comprising:
a memory that stores executable components; and
a processor, operatively coupled to the memory, that executes the executable components, the executable components comprising:
a data input component configured to receive a data batch comprising one or more time-series values of a data tag of an industrial device;
a modal analysis component configured to select a data reduction algorithm, from multiple predefined data reduction algorithms, based on a determination of whether a probability distribution of the time-series values contains a single mode, multiple modes, or no modes, wherein the multiple predefined data reduction algorithms comprise a first data reduction algorithm for probability distributions containing a single mode, a second data reduction algorithm for probability distributions containing multiple modes, and a third data reduction algorithm for probability distributions containing no modes; and
a data reduction component configured to apply the data reduction algorithm to the data batch to yield a reduced data set.

2. The node system of claim 1, wherein the modal analysis component is configured to, in response to determining that the probability distribution contains a single mode, select, as the first data reduction algorithm, an algorithm that generates the reduced data set to include a maximum value of the one or more time-series values and its corresponding time stamp, a minimum value of the one or more time-series values and its corresponding time stamp, and a value of the single mode and its corresponding time stamp.

3. The node system of claim 1, wherein the modal analysis component is configured to, in response to determining that the probability distribution contains multiple modes, select, as the second data reduction algorithm, an algorithm that generates the reduced data set to include a maximum value of the one or more time-series values and its corresponding time stamp, a minimum value of the one or more time-series values and its corresponding time stamp, and values of the multiple modes and their corresponding time stamps.

4. The node system of claim 1, wherein the modal analysis component is configured to, in response to determining that the probability distribution contains no modes, select, as the third data reduction algorithm, an algorithm that generates the reduced data set to include a maximum value of the one or more time-series values and its corresponding time stamp, a minimum value of the one or more time-series values and its corresponding time stamp, and one or more peak values and their corresponding time stamps.

5. The node system of claim 1, wherein the modal analysis component is configured to, in response to determining that the one or more time-series values satisfy a criterion indicating that a variance of the one or more time-series values is low, select, as the data reduction algorithm, an algorithm that generates the reduced data set to include a median value of the one or more time-series values and a time stamp selected from a time midpoint or approximate time midpoint of the data batch.

6. The node system of claim 5, wherein
the system further comprises a data averaging component configured to calculate a weighted moving average of the one or more time-series values, and
the criterion is satisfied if a difference between each of the one or more time-series values and the weighted moving average is less than a defined delta value.

7. The node system of claim 1, wherein the modal analysis component is configured to, in response to determining that the one or more time-series values are a same value, select, as the data reduction algorithm, an algorithm that generates the reduced data set to include a data record selected from a time midpoint or an approximate time midpoint of the data batch.

8. The node system of claim 1, wherein the data reduction component is further configured to define an association between respective data records of the reduced data set and their corresponding data records of the data batch.

9. The node system of claim 8, further comprising a data output component configured to send the data batch, the reduced data set, and the associations to an adjacent downstream node system of a data pipeline or to cloud-based storage.

10. The node system of claim 1, wherein the node system is a node of an industrial internet-of-things (IIoT) data pipeline.

11. A method, comprising:
receiving, by a system comprising a processor, a data batch comprising time-series values of a data tag of an industrial device;
selecting, by the system, a data reduction algorithm from multiple predefined data reduction algorithms based on a determination of whether a probability distribution of the time-series values is contains a single mode, multiple modes, or no modes; and
applying, by the system, the data reduction algorithm to the data batch to yield a reduced data set,
wherein the multiple predefined data reduction algorithms comprise a first data reduction algorithm for probability distributions containing a single mode, a second data reduction algorithm for probability distributions containing multiple modes, and a third data reduction algorithm for probability distributions containing no modes.

12. The method of claim 11, wherein the selecting comprises:
in response to determining that the probability distribution contains a single mode, selecting, as the first data reduction algorithm, an algorithm that generates the reduced data set to include a maximum value of the time-series values and its corresponding time stamp, a minimum value of the time-series values and its corresponding time stamp, and a value of the single mode and its corresponding time stamp.

13. The method of claim 11, wherein the selecting comprises:
in response to determining that the probability distribution contains multiple modes, selecting, as the second data reduction algorithm, an algorithm that generates the reduced data set to include a maximum value of the time-series values and its corresponding time stamp, a minimum value of the time-series values and its corresponding time stamp, and values of the multiple modes and their corresponding time stamps.

14. The method of claim 11, wherein the selecting comprises:
in response to determining that the probability distribution contains no modes, selecting, as the third data reduction algorithm, an algorithm that generates the reduced data set to include a maximum value of the time-series values and its corresponding time stamp, a minimum value of the time-series values and its corresponding time stamp, and peak values and their corresponding time stamps.

15. The method of claim 11, wherein the selecting comprises:
in response to determining that the time-series values satisfy a criterion indicating that a variance of the time-series values is low, selecting, as the data reduction algorithm, an algorithm that generates the reduced data set to include a median value of the time-series values and a time stamp selected from a time midpoint or approximate time midpoint of the data batch.

16. The method of claim 15, wherein the determining that the time-series values satisfy a criterion comprises:
calculating a weighted moving average of the time-series values, and
determining that a difference between each of the time-series values and the weighted moving average is less than a defined delta value.

17. The method of claim 11, wherein the selecting comprises:
in response to determining that the time-series values are a same value, selecting, as the data reduction algorithm, an algorithm that generates the reduced data set to include a data record selected from a time midpoint or an approximate time midpoint of the data batch.

18. The method of claim 11, further comprising defining an association between respective data records of the reduced data set and their corresponding data records of the data batch.

19. A non-transitory computer-readable medium having stored thereon instructions that, in response to execution, cause a system comprising a processor to perform operations, the operations comprising:
receiving a data batch comprising time-series values of a data tag of an industrial device;
determining whether a probability distribution of the time-series values is a unimodal distribution, is a multimodal distribution, or has no mode;
selecting, based on a result of the determining, a data reduction algorithm from multiple predefined data reduction algorithms, wherein the multiple predefined data reduction algorithms comprise a first data reduction algorithm for unimodal probability distributions, a second data reduction algorithm for multimodal probability distributions, and a third data reduction algorithm for probability distributions containing no modes; and
applying the data reduction algorithm to the data batch to yield a reduced data set.

20. The non-transitory computer-readable of claim 19, the operations further comprising defining an association between respective data records of the reduced data set and their corresponding data records of the data batch.

* * * * *